(12) United States Patent
Byun et al.

(10) Patent No.: US 11,039,285 B2
(45) Date of Patent: Jun. 15, 2021

(54) METHOD AND DEVICE FOR SETTING SPACE DIVISION CONNECTION BETWEEN TERMINALS FOR V2X COMMUNICATION

(71) Applicant: LG ELECTRONICS INC., Seoul (KR)

(72) Inventors: Ilmu Byun, Seoul (KR); Jiwon Kang, Seoul (KR); Heejin Kim, Seoul (KR); Heejeong Cho, Seoul (KR); Genebeck Hahn, Seoul (KR)

(73) Assignee: LG Electronics Inc., Seoul (KR)

( * ) Notice: Subject to any disclaimer, the term of this patent is extended or adjusted under 35 U.S.C. 154(b) by 256 days.

(21) Appl. No.: 16/341,832

(22) PCT Filed: Jul. 19, 2017

(86) PCT No.: PCT/KR2017/007792
§ 371 (c)(1),
(2) Date: Apr. 12, 2019

(87) PCT Pub. No.: WO2018/070647
PCT Pub. Date: Apr. 19, 2018

(65) Prior Publication Data
US 2021/0144524 A1 May 13, 2021

Related U.S. Application Data

(60) Provisional application No. 62/408,084, filed on Oct. 14, 2016, provisional application No. 62/424,543, filed on Nov. 20, 2016.

(51) Int. Cl.
*H04W 4/00* (2018.01)
*H04W 4/40* (2018.01)
(Continued)

(52) U.S. Cl.
CPC ............ *H04W 4/40* (2018.02); *H04B 17/336* (2015.01); *H04W 24/10* (2013.01); *H04W 72/02* (2013.01);
(Continued)

(58) Field of Classification Search
CPC ............... H04W 4/40; H04W 72/0446; H04W 72/0453; H04W 72/046; H04W 72/02; H04W 24/10; H04B 17/336
(Continued)

(56) References Cited

U.S. PATENT DOCUMENTS 9,497,672 B2 * 11/2016 Jang ................. H04W 36/0058
2004/0114381 A1 6/2004 Salmeen et al.
(Continued)

FOREIGN PATENT DOCUMENTS

WO    2016/148399 A1    9/2016

*Primary Examiner* — Thai D Hoang
(74) *Attorney, Agent, or Firm* — Dentons US LLP

(57) ABSTRACT

Provided are a method and a device for setting a space division connection between terminals for V2X communication in a wireless communication system. Specifically, a second terminal requests a connection setting with a first terminal from a base station. The second terminal measures a signal of the first terminal and generates a first beam group pair comprising a transmission beam group of the first terminal, which has a large signal size, and a reception beam group of the second terminal. When the second terminal receives a signal of a third terminal by using the reception beam group of the second terminal, the second terminal measures a signal of the third terminal and generates a second beam group pair comprising a transmission beam group of the third terminal, which has a large signal size, and the reception beam group of the second terminal.

16 Claims, 21 Drawing Sheets

(51) Int. Cl.
*H04W 72/04* (2009.01)
*H04W 72/02* (2009.01)
*H04B 17/336* (2015.01)
*H04W 24/10* (2009.01)

(52) U.S. Cl.
CPC ..... *H04W 72/046* (2013.01); *H04W 72/0446* (2013.01); *H04W 72/0453* (2013.01)

(58) Field of Classification Search
USPC ................ 370/329–330, 335–345, 347–349
See application file for complete search history.

(56) References Cited

U.S. PATENT DOCUMENTS

| | | |
|---|---|---|
| 2012/0093015 A1 | 4/2012 | Chen et al. |
| 2013/0086164 A1 | 4/2013 | Wheeler et al. |
| 2014/0192735 A1* | 7/2014 | Sridharan ........... H04L 61/2038 370/329 |
| 2015/0043444 A1* | 2/2015 | Wei ....................... H04B 7/0413 370/329 |
| 2015/0131568 A1* | 5/2015 | You ....................... H04W 88/02 370/329 |
| 2015/0195827 A1 | 7/2015 | Feng et al. |
| 2016/0021625 A1* | 1/2016 | Li ..................... H04W 72/0446 370/336 |
| 2016/0050667 A1* | 2/2016 | Papasakellariou .... H04L 1/1822 370/329 |
| 2016/0183239 A1* | 6/2016 | Lee ................... H04W 72/1215 370/329 |
| 2017/0265155 A1* | 9/2017 | Kim ................... H04W 56/001 |
| 2018/0227728 A1* | 8/2018 | Kim ..................... H04B 7/063 |
| 2018/0343605 A1* | 11/2018 | Wu ....................... H04B 7/088 |
| 2019/0306678 A1* | 10/2019 | Byun ................... H04B 7/0408 |
| 2020/0336908 A1* | 10/2020 | Kim ....................... H04L 67/12 |
| 2020/0396703 A1* | 12/2020 | Luo ..................... H04W 56/001 |

* cited by examiner

FIG. 12
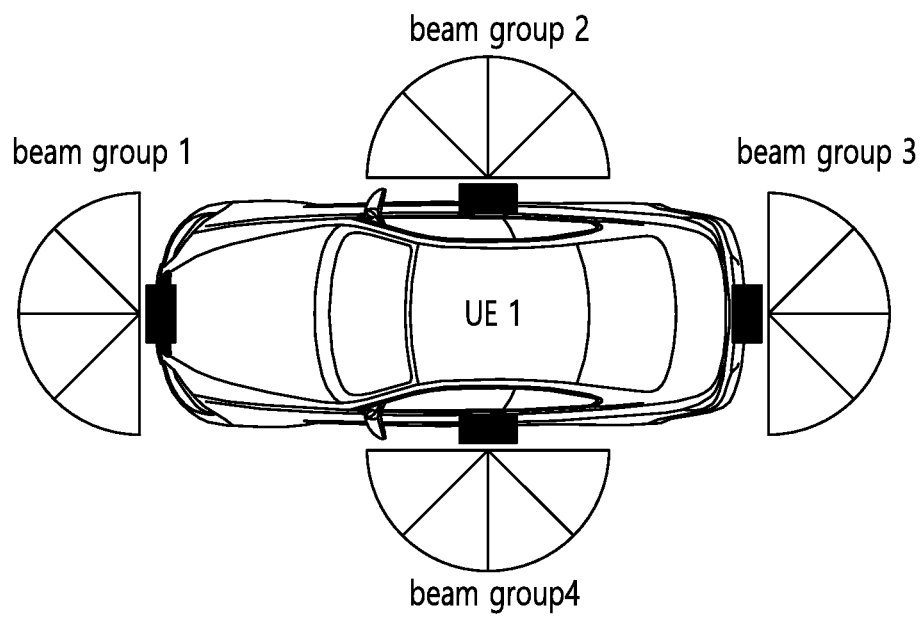
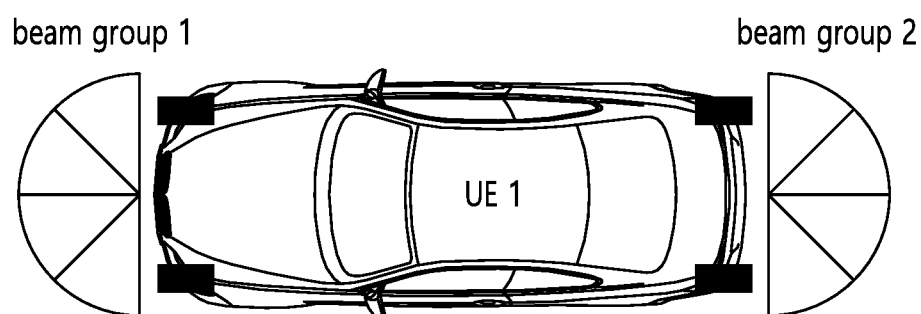
■ : RU

FIG. 13
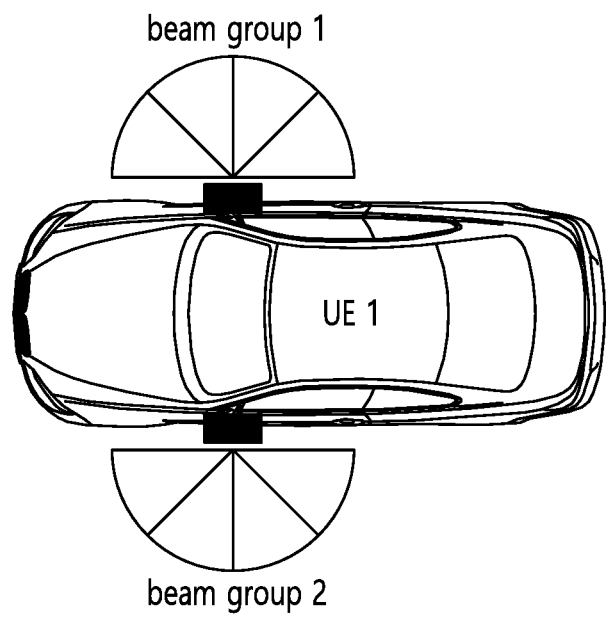
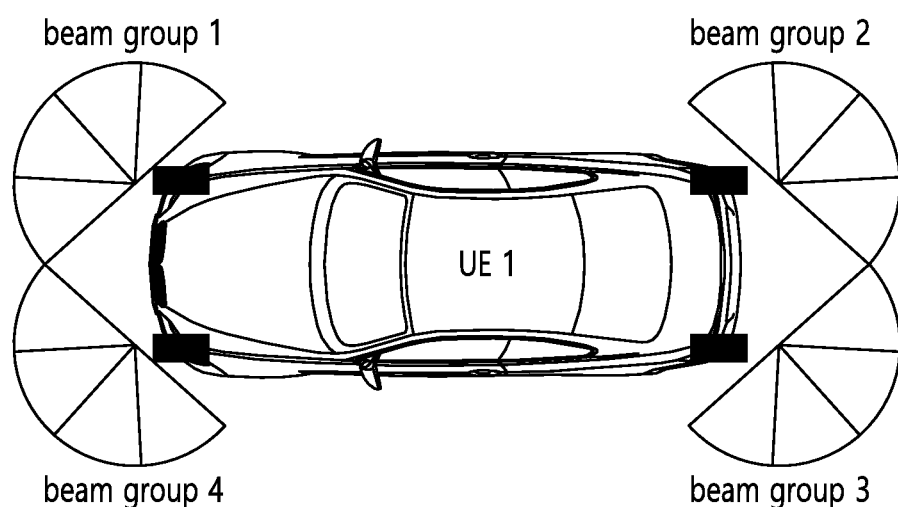
■ : RU

METHOD AND DEVICE FOR SETTING SPACE DIVISION CONNECTION BETWEEN TERMINALS FOR V2X COMMUNICATION

CROSS-REFERENCE TO RELATED APPLICATIONS

This application is the National Stage filing under 35 U.S.C. 371 of International Application No. PCT/KR2017/007792, filed on Jul. 19, 2017, which claims the benefit of U.S. Provisional Applications No. 62/408,084 filed on Oct. 14, 2016, and No. 62/424,543 filed on Nov. 20, 2016, the contents of which are all hereby incorporated by reference herein in their entirety.

BACKGROUND OF THE INVENTION

Field of the Invention

The present invention relates to wireless communication and, more particularly, to a method and device for setting a spatially divided connection between terminals for vehicle-to-everything (V2X) communication.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

LTE-based vehicle-to-everything (V2X) is urgently desired from market requirement as widely deployed LTE-based network provides the opportunity for the vehicle industry to realize the concept of 'connected cars'. The market for vehicle-to-vehicle (V2V) communication in particular is time sensitive because related activities such as research projects, field test, and regulatory work are already ongoing or expected to start in some countries or regions such as US, Europe, Japan, Korea, and China.

3GPP is actively conducting study and specification work on LTE-based V2X in order to respond to this situation. In LTE-based V2X, PC5-based V2V has been given highest priority. It is feasible to support V2V services based on LTE PC5 interface with necessary enhancements such as LTE sidelink resource allocation, physical layer structure, and synchronization. In the meantime, V2V operation scenarios based on not only LTE PC5 interface but also LTE Uu interface or a combination of Uu and PC5 has been considered. The maximum efficiency of V2V services may be achieved by selecting/switching the operation scenario properly.

Early completion of the corresponding radio access network (RAN) specification for PC5-based V2V and integration with Uu interface will enable fast preparation for device and network implementation, thereby allowing more chance for LTE-based V2V in the market. In addition, it can provide the basis for other V2X services, especially vehicle-to-infrastructure/network (V2I/N) and vehicle-to-pedestrian (V2P) services, so that RAN support for all the V2X services can be completed in time.

SUMMARY OF THE INVENTION

The present specification provides a method and device for setting a spatially divided connection between terminals for V2X communication.

The present specification proposes a method and device for setting a spatially divided connection between terminals for V2X communication.

The device comprises a radio frequency (RF) unit transmitting receiving a radio signal and a processor connected to the RF unit.

The present embodiment is related to communication among a plurality of terminals to which distributed antennas are applied, where the plurality of terminals perform communication by dividing a specific resource spatially by using a beam rather than in terms of frequency. At this time, a terminal may have a plurality of radio units (RUs), where an RU may correspond to an antenna port, and a beam group may be configured based on the antenna port.

Also, the present embodiment proposes a procedure and signaling required for a second terminal to establish a connection to a first terminal while the first terminal is connected to a third terminal.

The second terminal requests a base station to establish a connection to the first terminal. At this time, the first terminal is already connected to the third terminal. For the sake of convenience, the present specification assumes that a connection establishment request object is a base station, but the base station may be substituted by a road side unit (RSU) which performs a function similar to that of the base station, an RSU in the form of a terminal, or a terminal which performs the role of a cluster head within a communication group.

The second terminal measures a signal of the first terminal and generates a first beam group pair comprising a transmission beam group of the first group comprising first L1 transmission beams of the first terminal in the order of signal magnitude and a reception beam group of the second terminal. The first terminal may transmit a signal of the first terminal to the transmission beam group of the first terminal, and the second terminal may receive a signal of the first terminal to the reception beam group of the second terminal.

Here, the first beam group pair comprising beam groups exhibiting large signal magnitude comprises optimal beam groups suitable for communication of the first and second terminals. In other words, the second terminal may communicate with the first terminal by using a specific beam pair among the optimal beam groups suitable for communication between the first and second terminals.

When the second terminal receives a signal of the third terminal by using the reception beam group of the second terminal, the second terminal measures a signal of the third terminal and generates a second beam group pair comprising a transmission beam group of the third group comprising first L0 transmission beams of the third terminal in the order of signal magnitude and a reception beam group of the second terminal. In other words, the third terminal may transmit a signal of the third terminal to the transmission beam group of the third terminal, and the second terminal may receive the signal of the third terminal through the reception beam group of the second terminal configured previously for connecting to the first terminal. Here, L1 and L0 are natural numbers.

Here, the second beam group pair comprising beam groups exhibiting large signal magnitude comprises beam groups exerting large interference on communication between the first and second terminals. Large magnitude of a signal of the third terminal received by the reception beam group of the second terminal may be applied to the communication between the first and second terminal, which employs the reception beam group of the second terminal, as interference. In other words, information about the second beam group pair may be regarded as being used as interference information between neighboring terminals.

The second terminal transmits information about the first beam group pair and the second beam group pair to the base station.

The information about the first beam group pair may include a beam group index of each terminal belonging to the first beam group pair or a signal magnitude index corresponding to the beam group index of each terminal belonging to the first beam group pair. The information about the second beam group pair may include a beam group index of each terminal belonging to the second beam group pair or a signal magnitude index corresponding to the beam group index of each terminal belonging to the second beam group pair. The beam group index or beam index described in the present specification may be expressed explicitly as a beam group index or beam index when a base station and a terminal exchange a signal or expressed implicitly as a time index and/or reference signal index. As one example, when the number of analog beams that a terminal may generate by using one OFDM symbol is 1, the beam index may one-to-one correspond to the time index at which a reference signal is transmitted. As another example, if the number of analog beams that a terminal may generate by using one OFDM symbol is N, the beam index may correspond to the time index at which the n-th reference signal is transmitted. Here, n is an integer having a value of 1, 2, . . . , N.

Also, the reception beam group index of the second terminal may not be included in the information about the first beam group pair and the second beam group pair. By so doing, the amount of information about the first and second beam group pairs may be reduced.

The present embodiment may be divided into a case where the second terminal figures out the information in advance that the first and third terminals are connected to each other and a case where the second terminal does not know the information beforehand.

The following case illustrates a situation where the second terminal figures out the information in advance that the first and third terminals are connected to each other. A base station may broadcast a physical layer identifier of a terminal within a cell to the second terminal. The second terminal may check whether the first and third terminals are connected to each other based on the physical layer identifier of the terminal within the cell. In other words, the second terminal may figure out in advance through a common signal within the cell that the first and third terminals are connected to each other.

The following case illustrate a situation where the second terminal does not know the information in advance that the first and third terminals are connected to each other. First, the second terminal discovers the first terminal, measures a signal of the first terminal, and transmits information about a first beam group pair to a base station. After receiving the information about the first beam group pair from the second terminal, the base station may transmit indication information which instructs to measure a signal of the third terminal to the second terminal. In other words, the information that the first and third terminals are connected may be transmitted to the second terminal based on the indication information. Based on the indication information, the second terminal may check whether the first and third terminals are connected to each other. In other words, only after the second terminal receives indication information of a base station, the second terminal may figure out that the first and third terminal are connected to each other.

The second terminal receives, from the base station, information about a transmission beam group of the first terminal used for connecting to the first terminal from the first beam group pair.

Also, the base station may transmit to the first terminal information about a transmission beam group of the first terminal used for a connection between the first and second terminals from the first beam group pair. In other words, the base station selects a specific beam group from the first beam group pair received from the second terminal and determines to use the selected specific beam group for connecting to the first terminal. And the base station informs the first and second terminals of the information about a specific beam group (the transmission beam group of the first terminal) used for connecting to the first terminal.

Also, the base station may transmit, to the third terminal, information about a transmission group of the third terminal comprising the second beam group pair with a reception beam group of the second terminal used for connecting the first and second terminals to each other from the first beam group pair. At this time, the transmission beam group of the third terminal comprising the second beam group pair with the reception beam group of the second terminal used for connecting to the first terminal may use the same time-frequency resource used for connecting the first and second terminals (which may be applied as interference).

In other words, the base station informs the third terminal of the information about a transmission beam group of the third terminal which acts as interference on a specific beam group (the transmission beam group of the first terminal) selected from the first beam group pair. By doing so, the third terminal may not use the transmission beam group of the third terminal in a specific resource, which acts as interference to the transmission beam group of the first terminal selected from the first beam group pair. The specific resource may correspond to a resource used by the first and second terminals to transmit and receive a signal through a specific beam group selected from the first beam group.

In other words, the base station may perform scheduling so that the transmission beam group of the first terminal used for connecting the first and second terminals, reception beam group of the second terminal used for connecting the first and second terminals, and transmission beam group of the third group comprising the second beam group pair are not used in the same resource.

As another example, the base station may transmit, to the second terminal, the information about the transmission beam group of the third terminal which does not transmit a signal of the third terminal among transmission beam groups of the third terminal belonging to the second beam group pair. The transmission beam group of the third terminal which does not transmit a signal of the third terminal may not act as interference to the reception beam group of the second terminal used for connecting to the third terminal.

Through the beam group scheduling procedure of a base station, a new connection may be configured for the first and second terminals by using the transmission beam group of the first terminal and the reception beam group of the second terminal selected from the first beam group pair. Also, the third terminal may maintain a connection to the first terminal without using the transmission beam group of the third terminal which may act as interference to the transmission beam group of the first terminal selected from the first beam group pair in the same resource.

Therefore, the present embodiment may perform spatially divided communication among a plurality of terminals while omitting a procedure for measuring interference between neighboring terminals.

According to the proposed method, a procedure for measuring interference between neighboring terminals may be skipped when a terminal attempts to establish a connection, and thereby a connection may be established quickly. Also, information about interference which may be exerted to neighboring terminals due to a new connection may be delivered promptly.

BRIEF DESCRIPTION OF THE DRAWINGS

FIG. 12 shows an example of constituting a beam group for V2X communication.

FIG. 13 shows another example of constituting a beam group for V2X communication.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the 3GPP LTE/LTE-A. However, technical features of the present invention are not limited thereto.

Figure 1:
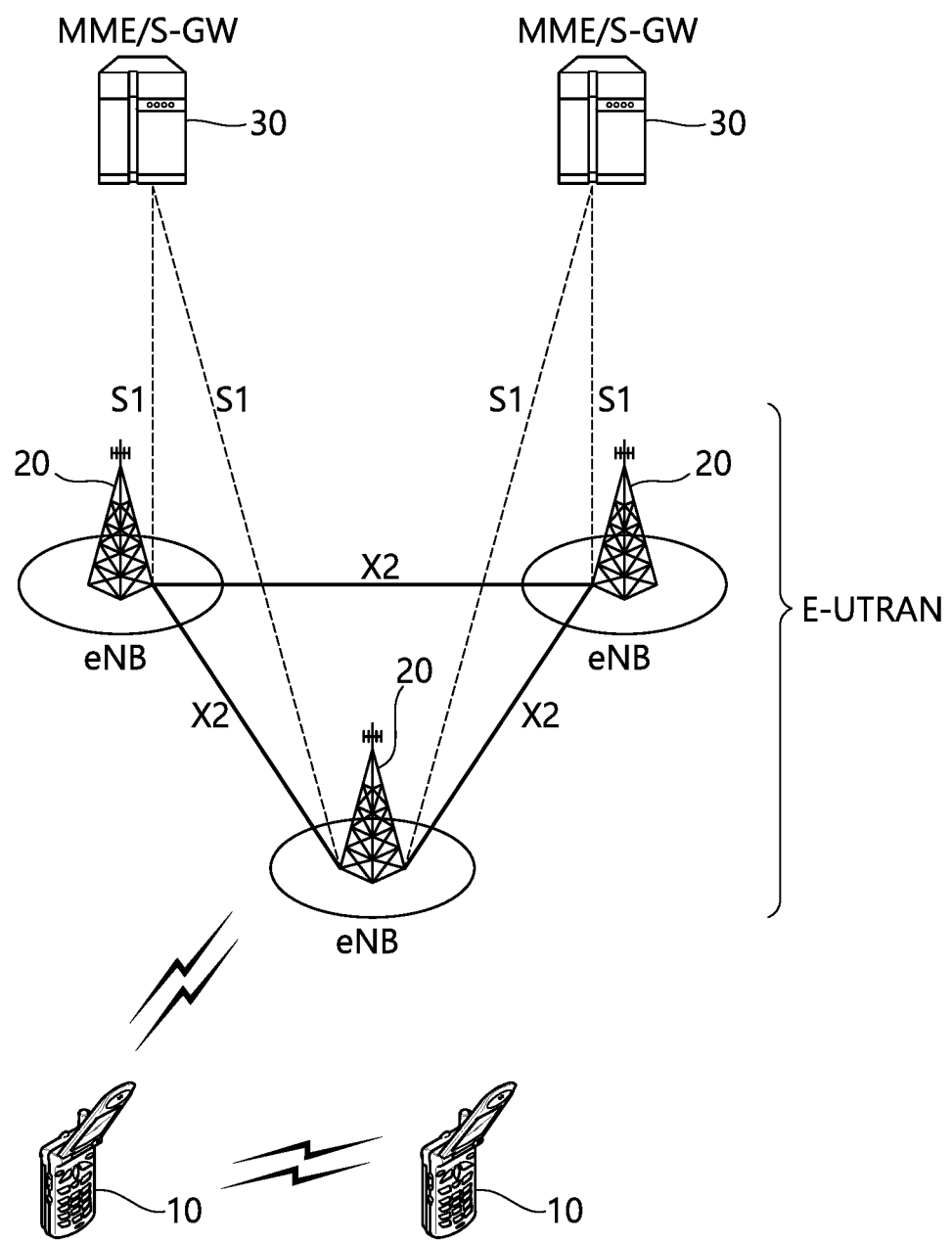
FIG. 1 illustrates a wireless communication system to which the present specification is applied.

FIG. 1 illustrates a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

A radio interface between the UE and the BS is called a Uu interface. Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
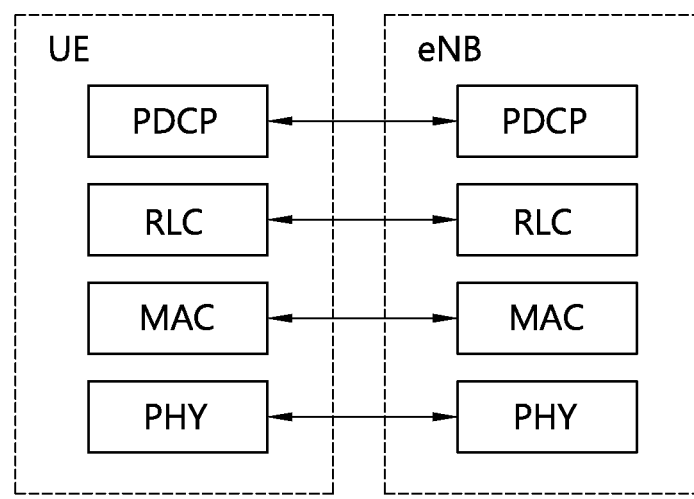
FIG. 2 is a block diagram illustrating a radio protocol architecture for a user plane.
Figure 3:
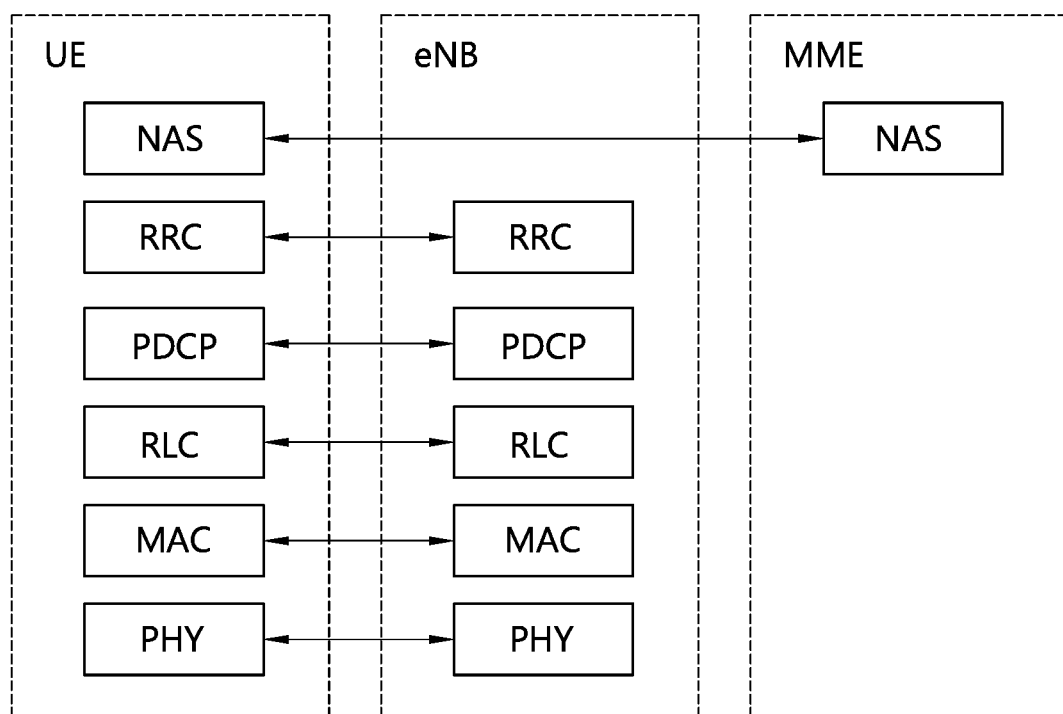
FIG. 3 is a block diagram illustrating a radio protocol architecture for a control plane.

FIG. 2 is a block diagram illustrating a radio protocol architecture for a user plane. FIG. 3 is a block diagram illustrating a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs).

An RB is a logical path provided by the first layer (i.e., the PHY layer) and the second layer (i.e., the MAC layer, the RLC layer, and the PDCP layer) for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state, and otherwise the UE is in an RRC idle state.

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Hereinafter, a sidelink is described. The sidelink is an interface between UEs for sidelink communication and sidelink direct discovery. The sidelink corresponds to a PC5 interface. The side link communication is AS functionality enabling proximity-based services (ProSe) direct communication between two or more nearby UEs by using an E-UTRAN technique but not traversing any network node. The sidelink discovery is AS functionality enabling ProSe direct discovery between two or more nearby UEs by using the E-UTRA technique but not traversing any network node. The sidelink uses a UL resource and physical channel structure similarly to UL transmission. Sidelink transmission uses the same basic transmission scheme as the UL transmission scheme. However, the sidelink is limited to single cluster transmission for all sidelink physical channels. In addition, the sidelink uses a gap of one symbol at an end of each sidelink subframe.

Figure 4:
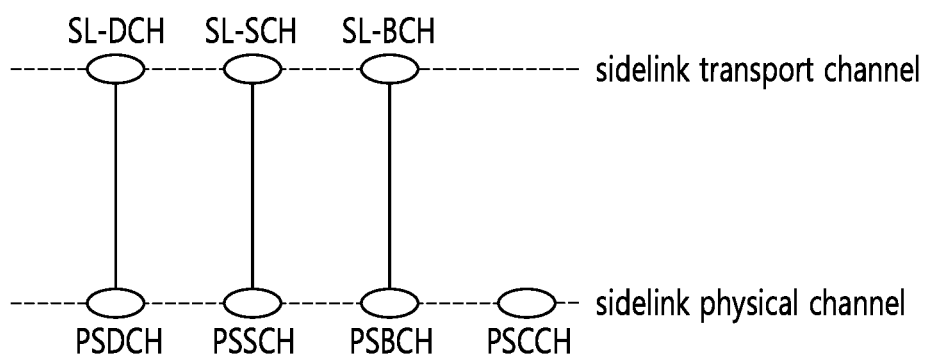
FIG. 4 shows mapping between sidelink transport channels and sidelink physical channels.

FIG. 4 shows mapping between sidelink transport channels and sidelink physical channels. Referring to FIG. 4, a physical sidelink discovery channel (PSDCH) carrying sidelink discovery message from the UE is mapped to a sidelink discovery channel (SL-DCH). A physical sidelink shared channel (PSSCH) carrying data from a UE for sidelink communication is mapped to a sidelink shared channel (SL-SCH). A physical sidelink broadcast channel (PSBCH) carrying system and synchronization related information, transmitted from the UE, is mapped to a sidelink broadcast channel (SL-BCH). A physical sidelink control channel (PSCCH) carries control from a UE for sidelink communication.

Figure 5:
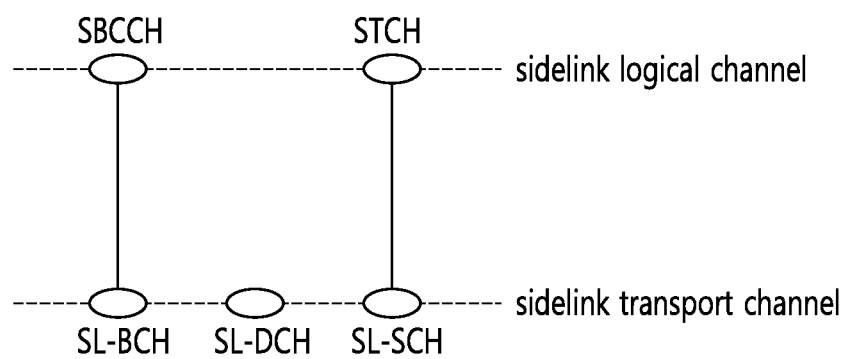
FIG. 5 shows mapping between sidelink logical channels and Sidelink transport channels.

FIG. 5 shows mapping between sidelink logical channels and Sidelink transport channels. Referring to FIG. 5, SL-BCH is mapped to a sidelink broadcast control channel (SBCCH). The SBCCH is a sidelink channel for broadcasting sidelink system information from one UE to other UE(s). This channel is used only by sidelink communication capable UEs. SL-SCH is mapped to a sidelink traffic channel (STCH). The STCH is a point-to-multipoint channel, for transfer of user information from one UE to other UEs. This channel is used only by sidelink communication capable UEs.

Sidelink communication is a mode of communication whereby UEs can communicate with each other directly over the PC5 interface. This communication mode is supported when the UE is served by E-UTRAN and when the UE is outside of E-UTRA coverage. Only those UEs authorized to be used for public safety operation can perform sidelink communication.

In order to perform synchronization for out of coverage operation, UE(s) may act as a synchronization source by transmitting SBCCH and a synchronization signal. SBCCH carries the most essential system information needed to receive other sidelink channels and signals. SBCCH along with a synchronization signal is transmitted with a fixed periodicity of 40 ms. When the UE is in network coverage, the contents of SBCCH are derived from the parameters signaled by the eNB. When the UE is out of coverage, if the UE selects another UE as a synchronization reference, then the content of SBCCH is derived from the received SBCCH. Otherwise, UE uses pre-configured parameters. System information block type-18 (SIB18) provides the resource information for synchronization signal and SBCCH transmission. There are two pre-configured subframes every 40 ms for out of coverage operation. UE receives synchronization signal and SBCCH in one subframe and transmit synchronization signal and SBCCH on another subframe if UE becomes synchronization source based on defined criterion.

UE performs sidelink communication on subframes defined over the duration of sidelink control period. The sidelink control period is the period over which resources allocated in a cell for sidelink control information and sidelink data transmissions occur. Within the sidelink control period, the UE sends sidelink control information followed by sidelink data. Sidelink control information indicates a Layer 1 ID and characteristics of the transmissions (e.g. MCS, location of the resource(s) over the duration of sidelink control period, timing alignment).

The UE performs transmission and reception over Uu and PC5 with the following decreasing priority order:
 Uu transmission/reception (highest priority);
 PC5 sidelink communication transmission/reception;
 PC5 sidelink discovery announcement/monitoring (lowest priority).

The UE supporting sidelink communication can operate in two modes for resource allocation. The first mode is a scheduled resource allocation. The scheduled resource allocation may be referred to as Mode 1. In Mode 1, the UE needs to be RRC_CONNECTED in order to transmit data. The UE requests transmission resources from the eNB. The eNB schedules transmission resources for transmission of sidelink control information and data. The UE sends a scheduling request (dedicated scheduling request (D-SR) or random access) to the eNB followed by a sidelink buffer status report (BSR). Based on the sidelink BSR, the eNB can determine that the UE has data for a sidelink communication transmission and estimate the resources needed for transmission. The eNB can schedule transmission resources for sidelink communication using configured sidelink radio network temporary identity (SL-RNTI).

The second mode is a UE autonomous resource selection. The UE autonomous resource selection may be referred to as Mode 2. In Mode 2, a UE on its own selects resources from resource pools and performs transport format selection to transmit sidelink control information and data. There can be up to 8 transmission pools either pre-configured for out of coverage operation or provided by RRC signalling for in-coverage operation. Each pool can have one or more ProSe per-packet-priority (PPPP) associated with it. For transmission of a MAC protocol data unit (PDU), UE selects a transmission pool in which one of the associated PPPP is equal to the PPPP of a logical channel with highest PPPP among the logical channel identified in the MAC PDU. There is one to one association between sidelink control pool and sidelink data pool. Once the resource pool is selected, the selection is valid for the entire sidelink control period. After the sidelink control period is finished, the UE may perform resource pool selection again.

A set of transmission and reception resource pools for sidelink control information when the UE is out of coverage for sidelink communication is pre-configured in the UE. The resource pools for sidelink control information when the UE is in coverage for sidelink communication are configured as below. The resource pools used for reception are configured by the eNB via RRC, in broadcast signaling. The resource pool used for transmission is configured by the eNB via RRC, in dedicated or broadcast signaling, if Mode 2 is used, and the resource pool used for transmission is configured by the eNB via RRC, in dedicated signaling if Mode 1 is used. The eNB schedules the specific resource(s) for sidelink control information transmission within the configured reception pools.

A set of transmission and reception resource pools for data when the UE is out of coverage for sidelink communication is pre-configured in the UE. The resource pools for data when the UE is in coverage for sidelink communication are configured as below. The resource pools used for transmission and reception are configured by the eNB via RRC, in dedicated or broadcast signaling, if Mode 2 is used. There is no resource pool for transmission and reception if Mode 1 is used.

Sidelink discovery is defined as the procedure used by the UE supporting sidelink discovery to discover other UE(s) in its proximity, using E-UTRA direct radio signals via PC5. Sidelink discovery is supported both when UE is served by EUTRAN and when UE is out of EUTRA coverage. Only ProSe-enabled public safety UE can perform sidelink discovery when it is out of EUTRA coverage. For public safety sidelink discovery, the allowed frequency is pre-configured in the UE, and is used even when UE is out of coverage of EUTRA in that frequency. The pre-configured frequency is the same frequency as the public safety ProSe carrier.

In order to perform synchronization, UE(s) participating in announcing of discovery messages may act as a synchronization source by transmitting a synchronization signal based on the resource information for synchronization signals provided in SIB19.

There are two types of resource allocation for discovery message announcement. The first type is UE autonomous resource selection which is a resource allocation procedure where resources for announcing of discovery message are allocated on a non UE specific basis. The UE autonomous resource selection may be referred to as Type 1. In Type 1, the eNB provides the UE(s) with the resource pool configuration used for announcing of discovery message. The configuration may be signaled in broadcast or dedicated signaling. The UE autonomously selects radio resource(s) from the indicated resource pool and announces discovery message. The UE can announce discovery message on a randomly selected discovery resource during each discovery period.

The second type is scheduled resource allocation which is a resource allocation procedure where resources for announcing of discovery message are allocated on per UE specific basis. The scheduled resource allocation may be referred to as Type 2. In Type 2, the UE in RRC_CONNECTED may request resource(s) for announcing of discovery message from the eNB via RRC. The eNB assigns resource(s) via RRC. The resources are allocated within the resource pool that is configured in UEs for announcement.

For UEs in RRC_IDLE, the eNB may select one of the following options. The eNB may provide a resource pool for UE autonomous resource selection based discovery message announcement in SIB19. UEs that are authorized for sidelink discovery use these resources for announcing discovery message in RRC_IDLE. Or, the eNB may indicate in SIB19 that it supports sidelink discovery but does not provide resources for discovery message announcement. UEs need to enter RRC_CONNECTED in order to request resources for discovery message announcement.

For UEs in RRC_CONNECTED, a UE authorized to perform sidelink discovery announcement indicates to the eNB that it wants to perform sidelink discovery announcement. UE can also indicate to the eNB, the frequency(s) in which sidelink discovery announcement is desired. The eNB validates whether the UE is authorized for sidelink discovery announcement using the UE context received from MME. The eNB may configure the UE with resource pool for UE autonomous resource selection for discovery message announcement via dedicated signaling. The eNB may configure resource pool along with dedicated resource in the form of time and frequency indices for discovery message announcement via dedicated RRC signaling. The resources allocated by the eNB via dedicated signaling are valid until the eNB re-configures the resource(s) by RRC signaling or the UE enters RRC_IDLE.

Authorized receiving UEs in RRC_IDLE and RRC_CONNECTED monitor resource pools used for UE autonomous resource selection and resource pools for scheduled resource allocation. The eNB provides the resource pool configuration used for discovery message monitoring on intra frequency, inter frequency of same or different PLMNs cells in RRC signaling (SIB19 or dedicated). The RRC signaling (SIB19 or dedicated) may contain detailed sidelink discovery configuration used for announcement of sidelink discovering in cells of intra-frequency, inter-frequency of same or different PLMNs.

Vehicle-to-everything (V2X) communication is described. V2X communication contains the three different types, i.e. vehicle-to-vehicle (V2V) communications, vehicle-to-infrastructure (V2I) communications, and vehicle-to-pedestrian (V2P) communications. These three types of V2X can use "co-operative awareness" to provide more intelligent services for end-users. This means that transport entities, such as vehicles, road side unit (RSU), and pedestrians, can collect knowledge of their local environment (e.g. information received from other vehicles or sensor equipment in proximity) to process and share that knowledge in order to provide more intelligent services, such as cooperative collision warning or autonomous driving.

V2X service is a type of communication service that involves a transmitting or receiving UE using V2V application via 3GPP transport. Based on the other party involved in the communication, it can be further divided into V2V service, V2I service, V2P service, and vehicle-to-network (V2N) service. V2V service is a type of V2X service, where both parties of the communication are UEs using V2V application. V2I service is a type of V2X service, where one party is a UE and the other party is an RSU both using V2I application. The RSU is an entity supporting V2I service that can transmit to, and receive from a UE using V2I application. RSU is implemented in an eNB or a stationary UE. V2P service is a type of V2X service, where both parties of the communication are UEs using V2P application. V2N service is a type of V2X service, where one party is a UE and the other party is a serving entity, both using V2N applications and communicating with each other via LTE network entities.

In V2V, E-UTRAN allows such UEs that are in proximity of each other to exchange V2V-related information using E-UTRA(N) when permission, authorization and proximity criteria are fulfilled. The proximity criteria can be configured by the mobile network operator (MNO). However, UEs supporting V2V service can exchange such information when served by or not served by E-UTRAN which supports V2X service. The UE supporting V2V applications transmits application layer information (e.g. about its location, dynamics, and attributes as part of the V2V service). The V2V payload must be flexible in order to accommodate different information contents, and the information can be transmitted periodically according to a configuration provided by the MNO. V2V is predominantly broadcast-based. V2V includes the exchange of V2V-related application information between distinct UEs directly and/or, due to the limited direct communication range of V2V, the exchange of V2V-related application information between distinct UEs via infrastructure supporting V2X Service, e.g., RSU, application server, etc.

In V2I, the UE supporting V2I applications sends application layer information to RSU. RSU sends application layer information to a group of UEs or a UE supporting V2I applications.

In V2P, E-UTRAN allows such UEs that are in proximity of each other to exchange V2P-related information using E-UTRAN when permission, authorization and proximity criteria are fulfilled. The proximity criteria can be configured by the MNO. However, UEs supporting V2P service can exchange such information even when not served by E-UTRAN which supports V2X service. The UE supporting V2P applications transmits application layer information. Such information can be broadcast by a vehicle with UE supporting V2X Service (e.g. warning to pedestrian), and/or by a pedestrian with UE supporting V2X Service (e.g. warning to vehicle). V2P includes the exchange of V2P-related application information between distinct UEs (one for vehicle and the other for pedestrian) directly and/or, due to the limited direct communication range of V2P, the exchange of V2P-related application information between distinct UEs via infrastructure supporting V2X service, e.g., RSU, application server, etc.

Hereinafter, space division duplex (SDD) for V2X communication is described.

The SDD considered in the present specification is a technique in which each antenna of a UE is subjected to space division to independently operate a communication link of each antenna. In order to independently operate the communication link for each antenna, self-interference between antennas of the UE shall be cancelled, and inter-ference between UEs included in the communication link shall be reduced.

As a technique for cancelling the self-interference between the antennas of the UE, there is a technique of applying analog and digital self-interference cancellation techniques or a technique of reducing the self-interference by securing a distance between the antennas. The latter has a lower complexity than the former and thus is easier to apply to real systems. The latter technique can be applied to a vehicle UE having a larger size than an existing communication UE by securing the distance between the antennas. The inter-cell interference reducing technique of the existing cellular communication system can be applied as a technique for reducing interference between UEs. At present, in cellular communication with a high frequency of at least 6 GHz, since a beam width is small in order to secure a communication distance, it is considered that there is a low probability that beams of adjacent cells overlap to cause interference. In addition, there is a high probability that a signal will is blocked by an object due to linearity of the signal. Since a surface of a vehicle is made of iron and a size thereof is large, there is a high probability that a high-frequency signal of an adjacent UE will be blocked.

Figure 6:
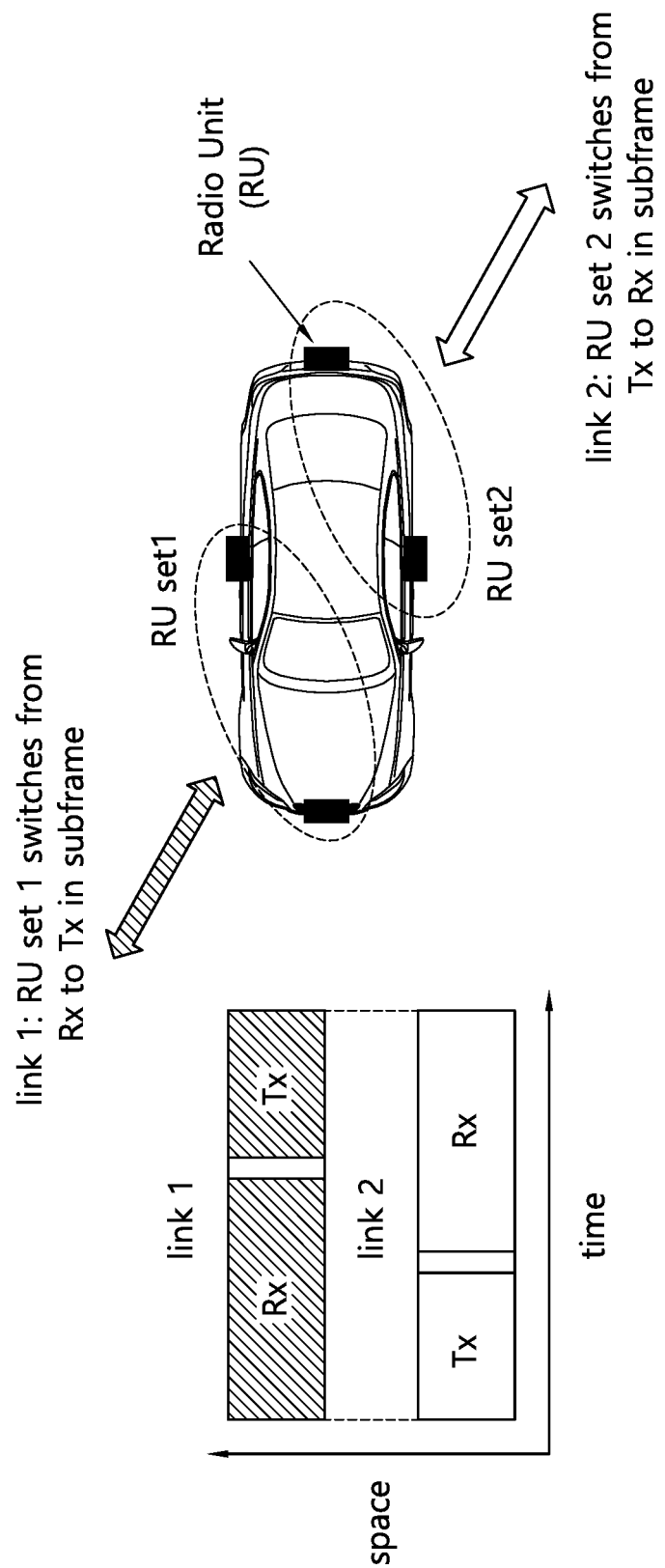
FIG. 6 shows an example of applying space division duplex (SDD) in a vehicle to which distributed antennas are applied.

Due to the above characteristics, space division communication is easy to apply in inter-vehicle high frequency communication with distributed antennas. When the space division communication is applied, since links of the antennas are isolated from each other, it is possible to allocate different transmission/reception points of the respective communication links and reuse frequency resources in each communication link. FIG. 6 is an example of applying space division communication.

FIG. 6 shows an example of applying SDD in a vehicle to which distributed antennas are applied.

In FIG. 6, a link 1 and a link 2 are communication links connected with different devices (UE or BS). According to a situation of each communication link, a transmission (Tx) resource and a reception (Rx) resource may change in amount, and a Tx time point and an Rx time point may change. In the figure above, a radio unit (RU) is an antenna module which aggregates a plurality of antennas. In this case, the UE has 4 RUs in a distributed manner. 2 RUs out of the 4 RUs are used to construct the link 1, and the remaining 2 RUs are used to construct the link 2.

Figure 7:
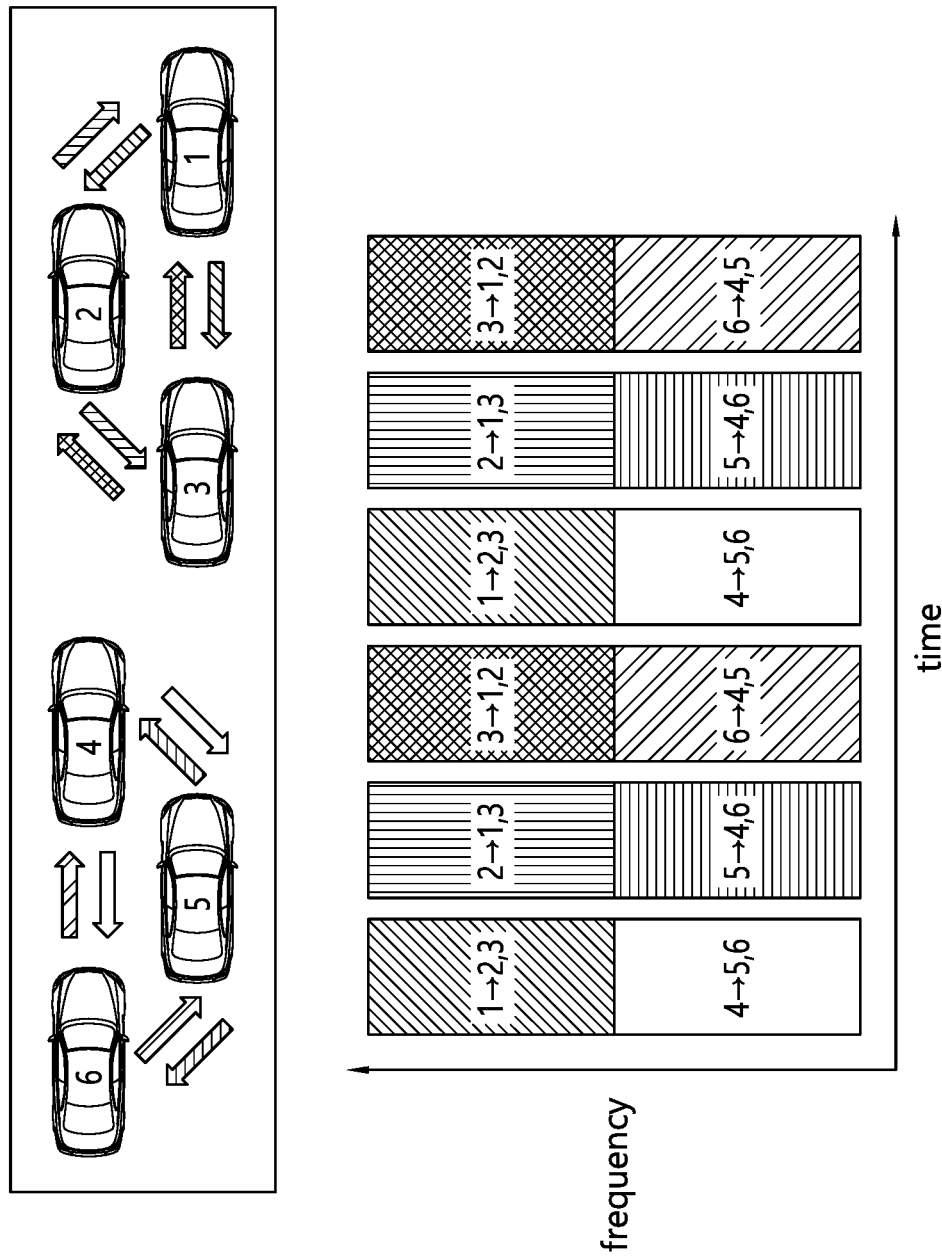
FIG. 7 shows an example of inter-vehicle communication to which SDD is not applied.
Figure 8:
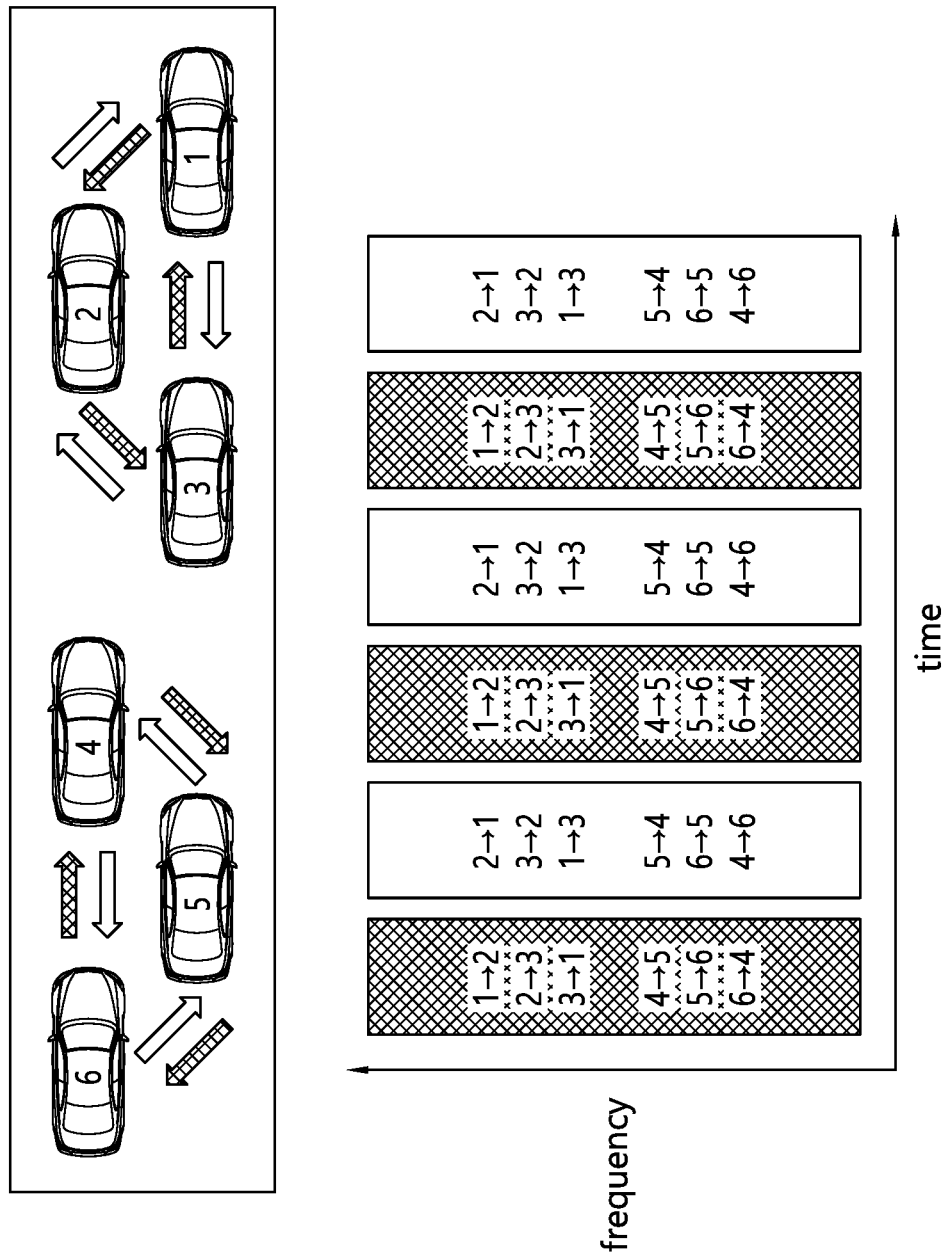
FIG. 8 shows an example of inter-vehicle communication to which SDD is applied.

When the SDD is applied to a plurality of UEs, there is an advantage in that transmission can be performed many times since more resources are used within a target time than the opposite case. FIG. 7 and FIG. 8 are examples of comparing a case of applying SDD and a case of not applying SDD.

FIG. 7 shows an example of inter-vehicle communication to which SDD is not applied. FIG. 8 shows an example of inter-vehicle communication to which SDD is applied.

When the SDD is not applied as shown in FIG. 7, a UE transmits signals simultaneously to different UEs in a multiplexed manner. If three UEs intend to establish a communication link with each adjacent UE as shown in FIG. 7, one transmission resource and two reception resources shall be allocated to each UE.

If the SDD is applied as shown in FIG. 8, since the UE needs to constitute one transmission resource and one reception resource for each communication link, the number of times of performing signal transmission may be greater in a unit time. In case of applying the SDD, a frequency resource allocated to the UE shall be shared with adjacent UEs which simultaneously transmit signals. If the SDD is applied, since a transmission signal of each UE is spatially divided, the same frequency resource can be used, thereby increasing the frequency resource used by each communication link.

In addition to the aforementioned advantage, since a receiving UE of each communication link receives a signal by using a narrow reception beam, a probability of being affected by jamming is decreased. In addition, since there is a high probability that an adjacent vehicle blocks a signal, jamming from a far distance is difficult. There is another advantage in that resource management complexity of a BS is decreased since the BS does not have to perform management so that inter-communication group resource and intra-communication group resource are resources orthogonal to each other. In TR 22.886, a scenario is included in which 15840 vehicles are present per one mile. In this case, complexity of the BS is too increased for the BS to manage each communication link between vehicles. When the SDD is applied, since only a transmission time point and a reception time point are to be determined between UEs included in the communication link, there is an advantage in that the complexity of the BS is decreased.

Hereinafter, a V2X use case for an automated vehicle is described.

<Scenario 1: Overtaking Maneuver Scenario>

Figure 9:
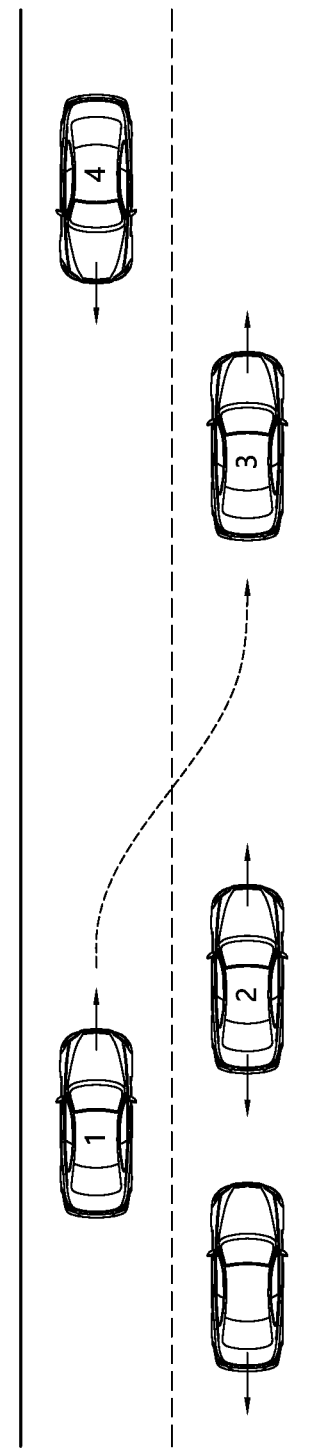
FIG. 9 shows an automated overtaking maneuver scenario in vehicle to everything (V2X) communication for an automated vehicle.

FIG. 9 shows an automated overtaking maneuver scenario in V2X communication for an automated vehicle.

Referring to FIG. 9, an automated vehicle 1 attempts to overtake another vehicle 2. During this attempt, an unpredictable change or deviation from the predicted trajectory may happen. It may come from the change of nearby vehicle's behavior or the appearance of animal and other objects on the road.

An overtaking maneuver has been planned with certain granularity and agreed upon by neighboring vehicles. The accuracy of the overtaking maneuver depends on the granularity (i.e. the size of discrete grid elements) of trajectories. If an unexpected road situation happens, a new joint solution needs to be negotiated quickly to avoid collisions. This needs to be completed before the vehicles enter the next grid element of the trajectory.

A road with a lane of width 3.5 m and a trajectory accuracy of 0.3 m is assumed in the present scenario. It is also assumed that vehicles on the road move with the speed of 30 m/s (108 km/h). In this case, each vehicle is passing a grid element every 10 ms.

If an unexpected road situation happens, a new plan has to be established in order to avoid an accident. A consolidated agreement on road trajectories requires at least three types of messages: a set of offered trajectories from each involved vehicle, an evaluation of all options, and an acknowledgment message. Each communication step needs to be completed within 3.3 ms, neglecting the computational requirements of each step.

<Scenario 2: Cooperative Perception Scenario>

Autonomous driving systems are based on the environmental information obtained via its own sensors. In reality, however, a vehicle cannot obtain the complete scene of the road and surrounding environment because of large trucks or busses blocking its view. Besides this, autonomous vehicles are expected not only to exchange the local awareness information between each other but also to be able to detect numerous features of surrounding environment by means of various sensors and cameras.

Cooperative active safety systems can warn drivers of dangerous situations and intervene through automatic braking or steering if the driver is unable to avoid an accident. Cooperative driving applications, such as platooning (road-trains) and highly automated driving can reduce travel time, fuel consumption, and $CO_2$ emissions and also increase road safety and traffic efficiency. Moreover, not only cooperation between vehicles or between vehicles and infrastructure is required, but also the cooperation between vehicles and vulnerable road users, e.g. pedestrians and cyclists, through their mobile devices, such as smartphone and tablets, will be an important key element to improve traffic safety. C-ITS systems rely on timely and reliable exchange of information. Common to most applications are real-time requirements, and strict requirements on reliability and availability, especially when considering high mobility and large message sizes.

In addition, in the traffic scenario, the front vehicle could provide the real-time video data to the rear vehicle on as-needed basis in complex driving situation such as an automatic overtaking maneuver. Usual values for commercial video encoders are in the range of 100 ms. Thus, the video is assumed to be transmitted in raw format to avoid encoding and decoding delays and be used in real time for driving purpose. The camera capabilities shall be sufficient for feature extraction suitable for future autonomous driving task. Assuming gray-scale video with a resolution 1280×720 pixels and a refresh state of 30 fps, a data rate of 220 Mbps is required.

In addition, end-to-end latency requirements of less than 5 ms for message sizes of about 1600 bytes need to be guaranteed for all V2X transmissions. Data is sent either event-driven or periodically with a rate of about 10 Hz. Relative speeds of up to 500 km/h are possible on high-speed highways. Periodic broadcast traffic consist of at least 1600 bytes with repetition rate of 1-50 Hz for transmission of information related to objects resulting from local environmental perception and the information related to the actual vehicle.

<Scenario 3: Platooning Scenario with/without Leading Vehicle>

Use case 3-1 (platoon with leading vehicle): Vehicles properly arranged in platoons with enabled automated control of their speed and steering allow to reduce fuel consumption, increase safety, improve road congestion and increase driver convenience. For obtaining true benefit from platooning, each vehicle in platoon must be equipped with certain communication technology to exchange real-time information about a change of platoon's common parameters, such as acceleration, breaking, change of trajectory, etc. Also, the vehicles have to follow each other as near as possible for the improvement of road congestion and optimal fuel consumption, but on the other hand, close spacing leads to higher risk of collision and requires very strict latency and reliability constraints.

Use case 3-2 (platoon without leading vehicle): In a multi-lane convoy use case, a leading vehicle, centralized controller, or supervisor does not exist. Instead, the vehicle control, in both lateral and longitudinal directions, is distributed over all members of the convoy (see FIG. 9). The result of this approach is that vehicle disturbances, such as a braking vehicle, affect all members of the convoy to a greater or lesser extent, resulting in a stable formation.

Figure 10:
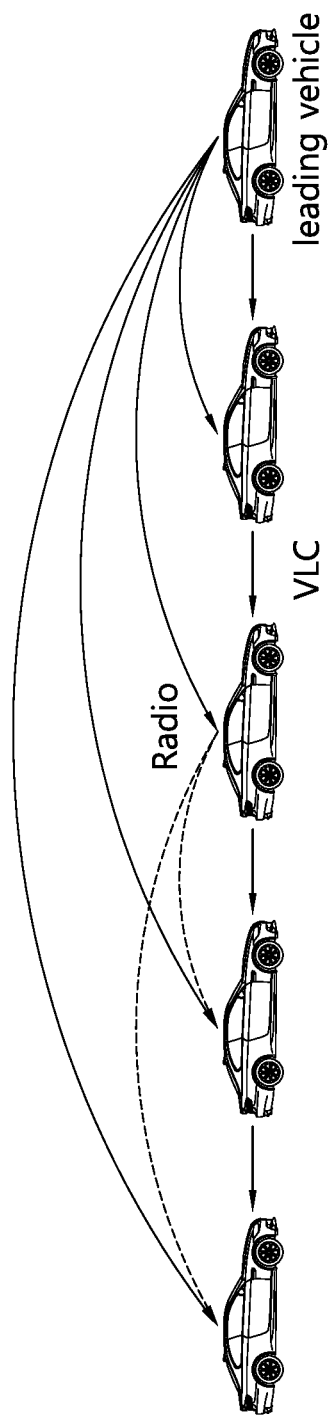
FIG. 10 shows a platoon scenario in V2X communication for an automated vehicle.

FIG. 10 shows a platoon scenario in V2X communication for an automated vehicle.

Scenario 3-1 (braking): It is assumed that each vehicle participated in a platoon has an advanced brake control to compensate for variances in vehicle load, road properties, and the brake system. The brake controller is imperfect so that the imperfection is modelled by additive Gaussian noise of a given variance. The probability of accident is approximately $10^{-6}$ when the variance of the brake controller is $10^{-4}$' vehicles in a platoon moves at speed of 23 m/s, the distance between vehicles is 4.5 m and the packet is successfully delivered at the first transmission. Thus, it can be seen that very low packet error rate (e.g. less than $10^{-6}$) is desirable.

Scenario 3-2 (platoon's common parameter+video data for cooperative perception): The leading vehicle in a platoon transmits platoon's common parameter to the following vehicles via a carrier 1. Also, its video data is delivered with/without platoon's common parameters to the rear vehicles in a multi hop fashion via a carrier 2. Usually, the carrier 2 has much higher frequency than the carrier 1. For example, DSRC and LTE V2V can be used as the carrier 1 and mmWave and visible light communication (VLC) can be used as the carrier 2. The carrier 1 has less propagation loss than the carrier 2 so that the carrier 1 can deliver platoon's common parameter to the last vehicle in the platoon within a short latency. However, the carrier 1 is vulnerable to radio jamming attacks and the areal spectral efficiency and data rate of the carrier 1 are lower than those of the carrier 2.

Scenario 3-3 (platoon without leading vehicle: convoy): In order to maintain small inter-vehicle distances, convoy members rely on the high-frequency exchange of up-to-date and high-quality vehicle dynamics data among vehicles in the convoy. The convoy control algorithm requires just the vehicle dynamics information of neighbor vehicles, instead of the information of all convoy members. As such, the algorithm scales well to large convoys and converges easily to a desired formation when vehicles join and leave the convoy.

Scenario 3-4: In addition to the scenario 2, I2V link or V2I2V link can be used to deliver verified information to vehicles in a platoon. Infrastructures collect information from its sensors and vehicles and forward it to a server. The server filters trumped-up and fabricated information. For example, the server could drop the information collected from vehicles in the black list. The server sends the filtered information to infrastructures and infrastructures forward the filtered information to vehicles in a platoon.

However, there is a possibility of signal blocking according to the aforementioned scenario. Reliability and low-latency of inter-vehicle communication are very important in a service such as a platoon or convoy described in the scenario 3. However, it is expected that a distance between vehicles is at least 4.5 m, and in general, a vehicle interval is set to about 6 to 8 m due to instability of a brake control device, a communication latency, or the like. When the vehicle interval is increased, any vehicle not belonging to the platoon may cut in between platoon groups to overtake. In this case, reliability of communication between platoon groups may deteriorate due to the cut-in vehicle. Summarizing terminologies, the platoon corresponds to a group of vehicles which are driven in a single lane, and autonomous driving is not necessary. The convoy corresponds to a group of vehicles which are driven in several lanes, and is used when the vehicle is automatically driven.

In addition, V2X communication is limited in an LTE system. Since a vehicle may cut in at any section of a platoon in the above scenario, a UE which blocks a signal may be any UE in a communication group. Therefore, in order to solve the aforementioned problem, any UE in a group shall be capable of relaying a signal transmitted by any UE. In the ongoing 3GPP V2X study item, studies are being conducted mainly on periodic signal broadcasting between vehicles, and a problem for the scenario cannot be solved by simply applying a corresponding result.

In addition, communication with low-latency and high-reliability is being proposed as a requirement for 5G V2X. For example, according to 3GPP TR22.886, in case of collective perception, it is necessary to transmit data to a vehicle in the range of 200 m with reliability of 99.999% within 3 ms, and in case of emergence trajectory, it is required to transmit data to a vehicle in the range of 500 m with reliability of 99.999% within 3 ms.

When the information is transmitted to the vehicle in the range of 500 m, there is a probability that the vehicle blocks a signal. Therefore, it is possible to consider a method of transferring a signal far away using multi-hop communication between vehicles. However, in multi-hop communication, a delay increases with the increase in the number of hops. This makes it difficult to transfer a signal within 3 ms. Therefore, a technique is needed to minimize the increase in the delay even if the number of hops increases.

Accordingly, a method of transmitting a relay signal for V2X communication capable of solving the above problem and necessity will be described hereinafter.

Figure 11:
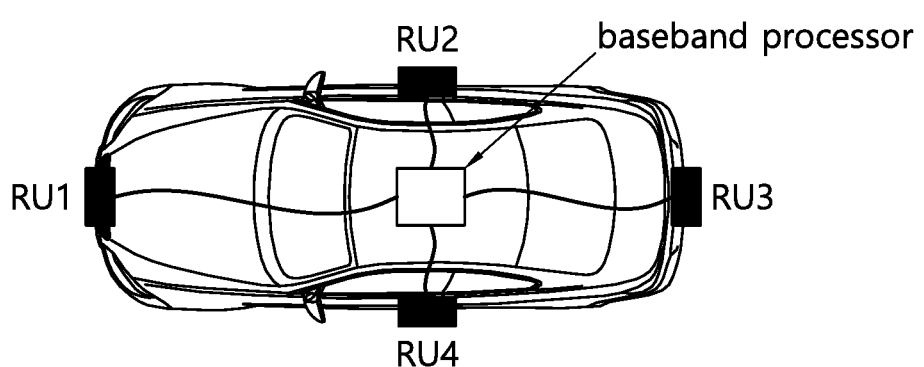
FIG. 11 shows an example of deploying a baseband processor and a radio unit (RU) in a vehicle which performs V2X communication.

FIG. 11 shows an example of deploying a baseband processor and an RU in a vehicle which performs V2X communication.

In the present specification, a radio unit (RU) may consist of one or multiple physical antennas, and one RU may have one or multiple antenna ports. The RU may simply have only a function of an RF module. When the RU simply has only the function of the RF module, the RU is the same as an antenna. In addition thereto, if the RU has only one antenna port, a single RU is the same as a single antenna port. The RU may include not only the function of the RF module but also the part or entirety of an L1 function or up to the part of an L2/L3 function.

In the present specification, the UE also includes a vehicle having a communication module installed therein, in addition to the existing mobile phone and smart phone. Referring to FIG. 11, the UE may have multiple RUs (RU 1, RU 2, RU 3, RU 4, . . . ). In addition, it can be seen that the multiple RUs are connected to a baseband processor.

In the present specification, a subframe is a time unit of a physical layer, and may be replaced with a time duration, a transmission time duration, a slot, a transmission unit (TU), or the like. In addition, a road side unit (RSU) described in the present specification may be a UE-type RSU or a BS-type RSU.

For example, when n vehicles constitute one platoon group, one communication group may be constituted by aggregating the n vehicles and an adjacent BS (herein, n is a natural number). For another example, all vehicles in a cell and a BS of the cell may constitute one communication group. In addition, one UE may belong to different communication groups at the same time.

Space division duplex communication described in the present specification implies not only communication in which an RU 1 and RU 2 of a UE 1 simultaneously transmit/receive signals but also communication in which the RU 2 can receive a signal while the RU 1 performs transmission or the RU 1 can receive a signal while the RU 2 transmits a signal. For this, the RU 1 and the RU 2 may be considered as a separate transmission and reception unit (TXRXU).

Although an entity for scheduling communication between UEs is described as a BS in the present specification, the BS may be replaced with an RSU or a UE-type RSU or a cluster head UE which is in charge of communication between the UEs.

A case where a UE is capable of configuring a beam group is assumed in the present specification. In the present specification, the beam group implies a unit by which the UE can independently perform transmission or reception. That is, a different beam group has a separate TXRXU. If self-interference between TXRXUs included in different beam groups is less than or equal to a specific value or can be decreased to be less than or equal to the specific value by using a self-interference canceller, the UE can transmit a signal in a beam group 2 while receiving a signal in a beam group 1. In addition, the beam group may be configured such that a Tx beam group and an Rx beam group are the same as or different from each other.

The beam group may correspond to the TXRXU in a one-to-one or one-to-many manner. That is, when the UE has N TXRXUs, the UE may construct N or less beam groups. In addition, the beam group may consist of one or more analog beams. For example, if the UE has N TXRXUs and analog beamforming is not applied to each TXRXU, the UE may have N beam groups and each beam group may consist of one beam. In this case, the beam group is the same as the TXRXU. For another example, if the UE has N TXRXUs and analog beamforming is applied to each TXRXU, the UE may have N beam groups and each beam group may consist of multiple beams.

FIG. 12 and FIG. 13 are examples of constructing a beam group when each RU has a separate TXRXU. In FIG. 12 and FIG. 13, a fan-shaped portion indicates a single beam, and implies a case where one beam group consists of four beams.

FIG. 12 shows an example of constituting a beam group for V2X communication.

In an upper end of FIG. 12, a UE 1 has four beam groups, and four TXRXUs are located in front, rear, and both sides of a vehicle. In a lower end, the UE 1 has two beam groups, and four TXRXUs are located only in front and rear of the vehicle.

FIG. 13 shows another example of constituting a beam group for V2X communication.

In an upper end of FIG. 13, a UE 1 has two beam groups, and two TXRXUs are located only in both sides of a vehicle. In a lower end of FIG. 13, the UE 1 has four beam groups, and four TXRXUs are located at corner portions in front and rear of the vehicle.

In what follows, the present specification aims to propose an interference measurement procedure by which a terminal having a plurality of radio units (RUs) receives a signal from a specific RU while transmitting a signal through other RU; and signaling related to the procedure. In particular, the present specification takes into account a case where interference exists between RUs, and an analog interference canceller capable of removing the interference is included in the RU.

Figure 14:
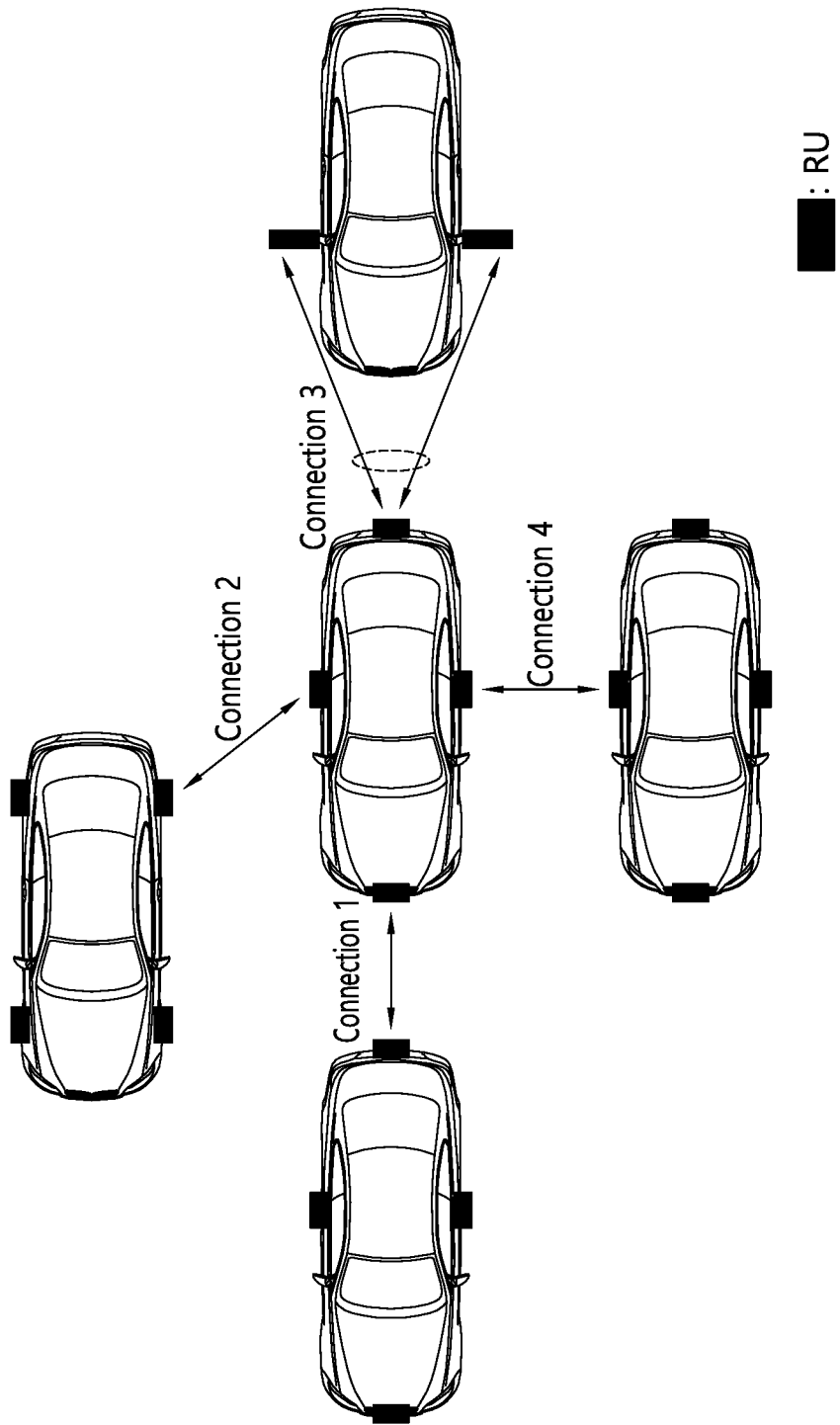
FIG. 14 illustrates one example where a plurality of communication connections are established among vehicles having a plurality of RUs.

FIG. 14 illustrates one example where a plurality of communication connections are established among vehicles having a plurality of RUs.

To provide services such as platooning, convoy, and cooperative maneuver assistance described above, a vehicle needs to establish a communication connection to other vehicles in its front, back, left and right sides as shown in FIG. 14. Therefore, a vehicle which has received the corresponding service forms a plurality of V2V links. Also, for a service such as platooning or convoy described in the scenario 3, it is important to achieve high reliability while satisfying a delay of about 3 ms.

The current LTE V2V communication has been developed to broadcast information of a vehicle in the surroundings thereof, and standardization of V2V connection establishment for unicast has not been carried out. Moreover, since it is important to transmit a signal in all directions for broadcasting, V2V communication technology has been developed under an assumption that a vehicle is equipped with a single RU having omni-antenna characteristics; however, it is expected that vehicles equipped with a plurality of RUs with directivity will be introduced in a near future. As shown in FIG. 14, if vehicle establishes a plurality of V2V communication connections, it is expected that a vehicle equipped with a plurality of RUs will have an advantage in terms of communication delay and capacity, technology development is needed, which enables a vehicle with a plurality of RUs to establish a plurality of communication connections. Besides, as shown in FIG. 14, if a vehicle equipped with a plurality of RUs performs an operation of transmitting a signal through a specific RU while receiving a signal from other specific RU, an advantage is obtained that signals may be transmitted within a shorter time period.

According to the present specification, an RU may be composed of one or more physical antennas, and one RU may have one or more antenna ports. An RU may provide only the function of a simple RF module or provide the whole or part of L1 function. Also, an RU may include part of L2/L3 function. If an RU has one antenna port and provides only the function of an RF module, a single RU is the same as a single antenna port. Therefore, an RU according to the present invention may be substituted by an antenna port group, antenna port, or antenna module.

In the present specification, a terminal includes a vehicle equipped with a communication model in addition to an existing mobile phone and smartphone, and the terminal may have a plurality of RUs. In the present specification, a subframe is a time unit of the physical layer and may also be called a time interval, transmission time interval, slot, or transmission unit (TU).

Space division duplex communication according to the present specification refers to such kind of communication by which not only RU1 and RU2 of a terminal may transmit and receive a signal simultaneously but also RU2 may receive a signal while RU1 transmits a signal or RU1 may receive a signal while RU2 transmit a signal. Also, a road side unit (RSU) in the present specification may be an RSU in the form of a terminal or an RSU in the form of a base station.

Space division duplex communication according to the present invention refers to such kind of communication by which not only RU1 and RU2 of a terminal may transmit and receive a signal simultaneously but also RU2 may receive a signal while RU1 transmits a signal or RU1 may receive a signal while RU2 transmit a signal. To this purpose, RU1 and RU2 may be regarded as a separate transmission and reception unit (TXRXU).

In what follows, the present specification proposes a method for a terminal equipped with a plurality of RUs to establish a connection for communication among a plurality of terminals.

As one example, a terminal may generate a plurality of connections for communication among terminals. When terminal 1 discovers terminal 2 and attempts to establish a new connection for communicating with terminal 2, terminal 1 transmits, to the base station, information of radio units (RUs) of terminal 1 to be used for the corresponding connection and information about terminal 2 that terminal 1 has discovered.

Since an RU having directivity may transmit and receive a signal only in particular directions, terminal 1 may use different RUs for the respective communication connections. Therefore, it is necessary for a terminal to explicitly inform a base station of candidate RUs to be used for connections that the terminal desires to establish for communication among terminals. Also, since an RU requested by terminal 1 may not be utilized for a communication connection depending on the network condition, it is required to finally determine an RU to be used by a base station for establishing a connection. As one example, when terminal 1 requests to establish a connection to terminal 2, terminal 3 may request a connection to terminal 1. As another example, an RU to be used for connecting to terminal 0 which has been configured previously to be connected to terminal 1 may be changed.

One communication connection may be formed by using a plurality of RUs. If a single RU is enough to obtain desired communication reliability and capacity from a communication connection between terminal 1 and 2, it is possible to establish a connection by using only one RU, and it is also possible to use a plurality of RUs to establish a connection when a plurality of RUs are required.

Also, a terminal informs a base station of priorities of a plurality of candidate RUs. Methods that may be employed for this purpose include (1) a method for transmitting received signal-to-ratio (SNR) information of a signal of terminal 2 for each RU to a base station and (2) a method for placing an RU with a high priority at the front of information when composing the information. As one example, if a terminal transmits candidate RUs to a base station in the order of RU0, RU2, and RU1, the base station regards RU0 as the RU with the highest priority.

Also, terminal 1 may include an RU used for an existing connection in the candidate RUs to be used for a new connection.

For example, it is assumed that terminal 1 already has a connection to terminal 0 and uses RU0 and RU1 for the connection to terminal 0. At this time, when terminal 1 establishes a connection to terminal 2, terminal 1 may request RU1 and RU2 from a base station as candidate RUs. After receiving the request, the base station may instruct terminal 1 and terminal 0 to remove RU1 for the connection to terminal 0, while allowing RU1 and RU2 to be used for connecting terminal 1 and terminal 2. Otherwise, RUs to be used for connecting terminal 1 and terminal 0 may still be maintained.

Also, a terminal transmits information about RUs to be used for an existing connection together with information of RUs to be used for a new connection. A base station which receives the information may instruct terminal 1 to change RUs used for the existing connection.

Figure 15:
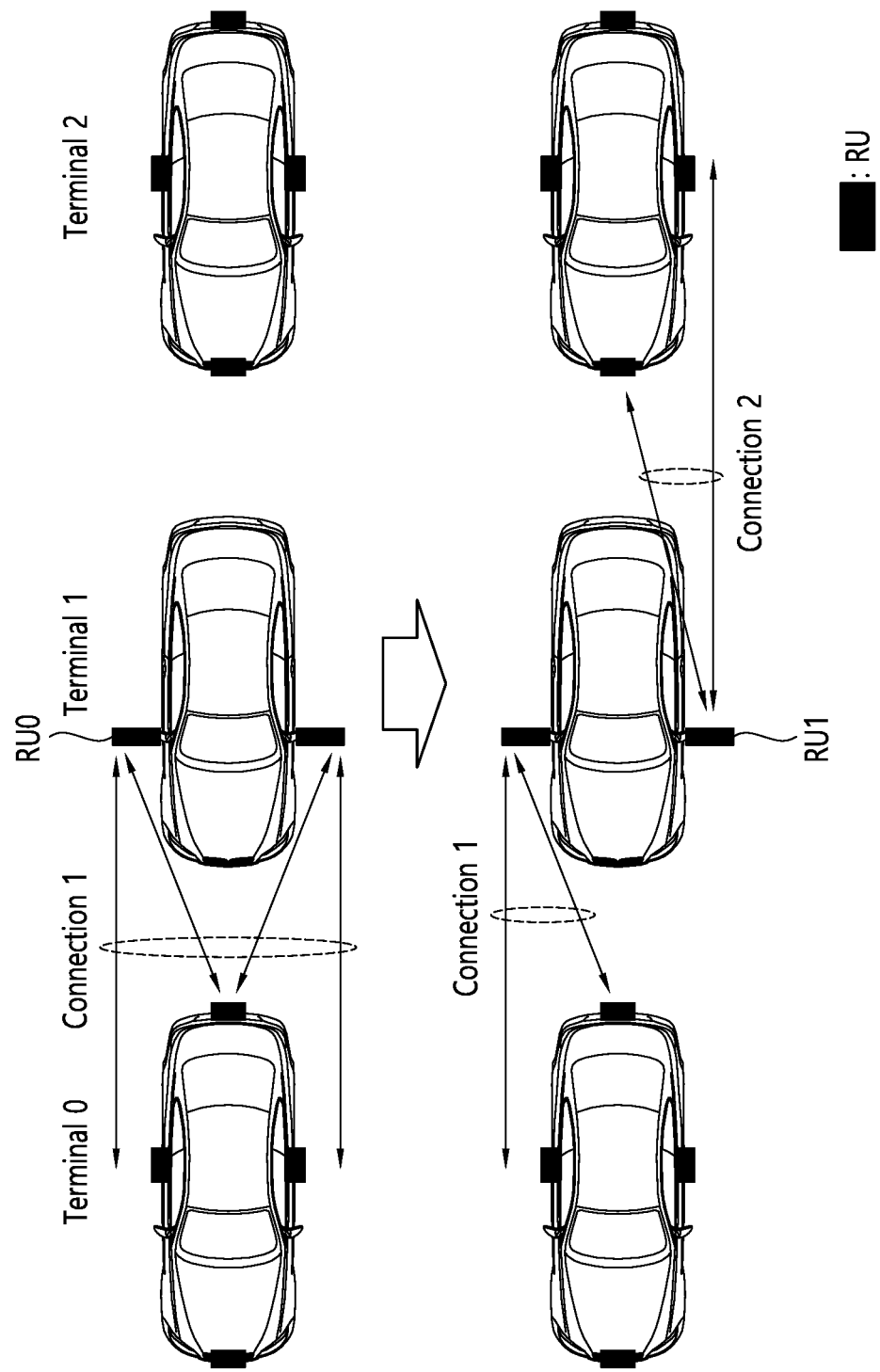
FIG. 15 illustrates one example where a terminal converts an RU used for an existing connection to one for a new connection.

FIG. 15 illustrates one example where a terminal converts an RU used for an existing connection to one for a new connection.

Referring to FIG. 15, between RU0 and RU1 used by terminal 1 to connect to terminal 0, terminal 1 may release RU1 and may use RU1 for connecting to terminal 2. In this case, a base station may instruct terminal 1 to use RU1 for connecting to terminal 2.

More specifically, while being connected to terminal 0 (connection 1) by using RU0 and RU1, terminal 1 may release a connection which uses RU1 and uses the release RU1 for connecting to terminal 2 (connection 2). At this time, the connection between terminal 1 and terminal 0 which uses RU0 (connection 1) is still maintained.

As one example, a terminal may (1) transmit received SNR to a base station as information about RUs used for existing connections or (2) compose the information by placing RUs with high priorities at the front thereof and transmit the information to the base station.

Figure 16:
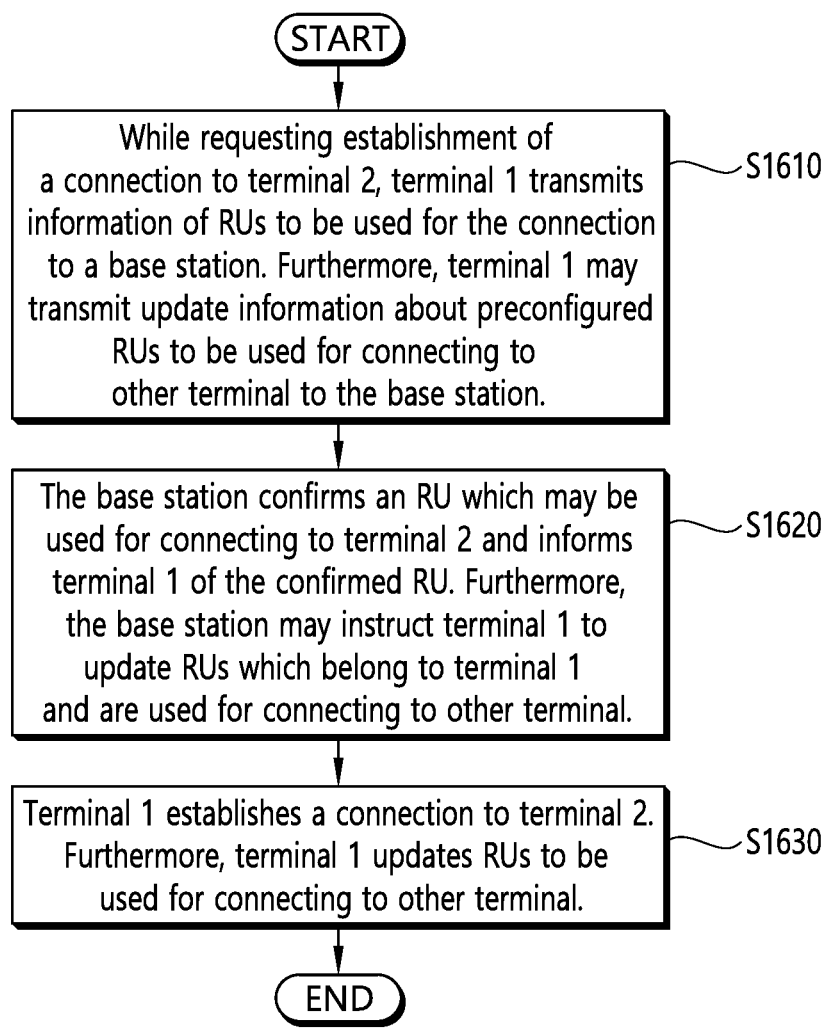
FIG. 16 illustrates a flow diagram for establishing a connection for communication among a plurality of terminals by a terminal having a plurality of RUs.

FIG. 16 illustrates a flow diagram for establishing a connection for communication among a plurality of terminals by a terminal having a plurality of RUs.

At the S1610 step, while requesting establishment of a connection to terminal 2, terminal 1 transmits information of RUs to be used for the connection to a base station. Furthermore, terminal 1 may transmit update information about preconfigured RUs to be used for connecting to other terminal (terminal 0) to the base station.

At the S1620 step, the base station confirms an RU which may be used for connecting to terminal 2 and informs terminal 1 of the confirmed RU. Furthermore, the base station may instruct terminal 1 to update RUs which belong to terminal 1 and are used for connecting to other terminal (terminal 0).

Terminal 1 establishes a connection to terminal 2. Furthermore, terminal 1 updates RUs to be used for connecting to other terminal (terminal 0).

Also, terminal 1 may transmit information about long-term average of inter-RU interference to the base station. Inter-RU interference information includes information about interference among RUs used for a new connection and information about interference between RUs used for the new connection and RUs used for an existing connection.

If a terminal is equipped with a plurality of high-frequency RUs having directivity, interference between RUs may be very small. As one example, interference between an RU in the front of terminal 1 and an RU in the rear thereof may be negligible. In this case, the base station may instruct terminal 1 to receive signal 1 from the RU in front of terminal 1 and at the same time, to receive or transmit signal 2 from the RU in the rear thereof. To carry out the operation above, it is necessary for the terminal to transmit information about long-term average of inter-RU interference to the base station.

Also, the base station may request measurement of interference between RUs used by terminal 1 for a connection. The base station may request not only measurement of interference between RUs used for a new connection but also measurement of interference between an RU used for an existing connection and an RU used for a new connection. After measuring the interference between RUs, terminal 1 transmits the measurement to the base station.

The base station may request a terminal to measure interference between RUs to figure out the interference between RUs belonging to the terminal.

The base station allocates as many resources for interference measurement as the number of RUs to be used for existing and new connections by a terminal. As one example, if the number of RUs used for an existing connection by terminal 1 is N1, and the number of RUs used for a new connection is N2, and the number of overlapping RUs among RUs used for the existing connection and RUs used for the new connection is N3, the base station periodically allocates N (=N1+N2−N3) orthogonal resources for interference measurement.

A terminal which receives N orthogonal resources for interference measurement performs the following operation. RU1 transmits a training sequence for interference measurement from resource 1, and the remaining N−1 RUs measure interference while receiving signals. Afterwards, resource 2 transmits a training sequence for interference measurement from resource 2, and the remaining N−1 RUs measure interference while receiving signals. In this way, interference among N communication links is measured.

Also, it is assumed that terminal 1 determines RUs of terminal 2 in the discovery phase, which are suitable for a connection. In this case, terminal 1 transmits information of preferred RUs in terminal 2 to the base station together with information of RUs in terminal 1 to be used for connecting to terminal 2.

In the same way as terminal 1, terminal 2 may have a plurality of RUs and want to use only part of the RUs for connecting to terminal 1. If terminal 1 informs the base station of RUs in terminal 2 with a good received SNR, it is advantageous that the base station may simplify the procedure for selecting RUs of terminal 2 when a connection between terminal 1 and terminal 2 is established.

Terminal 1 informs the base station of information of RU pairs to be used for connecting to terminal 2. As one example, suppose terminal 1 attempts to use RU1 and RU2 for connecting to terminal 2 and prefers RU1 and RU2 of terminal 2. At this time, terminal 1 transmits, to the base station, SNR when RU1 of terminal 1 receives a signal of RU1 of terminal 2, SNR when RU1 of terminal 1 receives a signal of RU2 of terminal 2, SNR when RU2 of terminal 1 receives a signal of RU1 of terminal 2, and SNR when RU2 of terminal 1 receives a signal of RU2 of terminal 2.

As another example, terminal 1 may transmit a request for establishing a connection to terminal 2 and a request for establishing a connection to terminal 3 together to the base station. The base station may respond to terminal 1 with a response signal to the request for establishing a connection to terminal 2 and with a response signal to the request for establishing a connection to terminal 3 at different times.

For communication between terminals, a discovery interval intended for discovering a neighboring terminal may exist. In the corresponding interval, a terminal may find a plurality of neighboring terminals, and in this case, the terminal may request a base station to establish a plurality of connections to the plurality of terminals simultaneously. When the base station which has received the request performs connection establishment among terminals, time required for establishing connections may differ from each other. As one example, for connection establishment to terminal 2, reconfiguration of RUs of terminal 2 is not necessary, but for connection establishment to terminal 3, it may be necessary to release RUs used for other connection by terminal 3. At this time, since time required for the respective connections differs from each other, the base station is required to respond to the individual connections at different times.

By using the proposed method, a terminal may establish connections to a plurality of terminals. Also, different RUs may be applied to the respective connections, and if interference between RUs used for different connections is small, the terminal may be operated so that the terminal may transmit a signal through one RU while receiving a signal through another RU.

In what follows, the present specification proposes a procedure for establishing a spatially divided connection by a terminal. The proposed method of the present invention proposes a procedure for establishing a connection efficiently while minimizing consumption of resources for discovery between terminals.

In a near future, it is expected that distributed antennas are applied to vehicles. When vehicles equipped with distributed antennas perform vehicle-to-vehicle communication, each vehicle may perform inter-vehicle communication by using only part of the antennas.

Therefore, from the discovery phase for discovering a neighboring vehicle, distinguishing antennas to be used for actual communication from those not to be used for the communication brings an effect of reducing a procedure for establishing a connection.

Also, mmWave may be applied for communication among terminals. A beam scanning process is employed for selecting an optimal analog beam in using mmWave for communication between a base station and a terminal. In this case, a process is required that a transmitter terminal transmits a reference signal for beam scanning, and a receiver terminal receives the transmitted reference signal in order to select an optimal beam. However, depending on hardware features, terminals may exhibit different analog beam resolution. Therefore, it is necessary for terminals to set up their beam resolution differently when beam scanning resources for inter-terminal communication are configured.

The method according to the present specification proposes a resource-efficient, two-phase discovery procedure used when communication between terminals is performed.

The present embodiment proposes a procedure for terminal 2 to establish a connection to terminal 1 and signaling for the procedure when terminal 1 has a connection to terminal 0, and terminal 2 wants to establish a connection to terminal 1. The procedure according to present embodiment assumes a situation where each terminal periodically transmits a discoverable signal. Also, the method has been developed in such a way that the effect due to a newly established connection which may be exerted on an existing connection is minimized. Also, the relationship between terminal 0, 1, and 2 described in the present embodiment may be represented by the relationship illustrated in FIG. 15.

Figure 19:
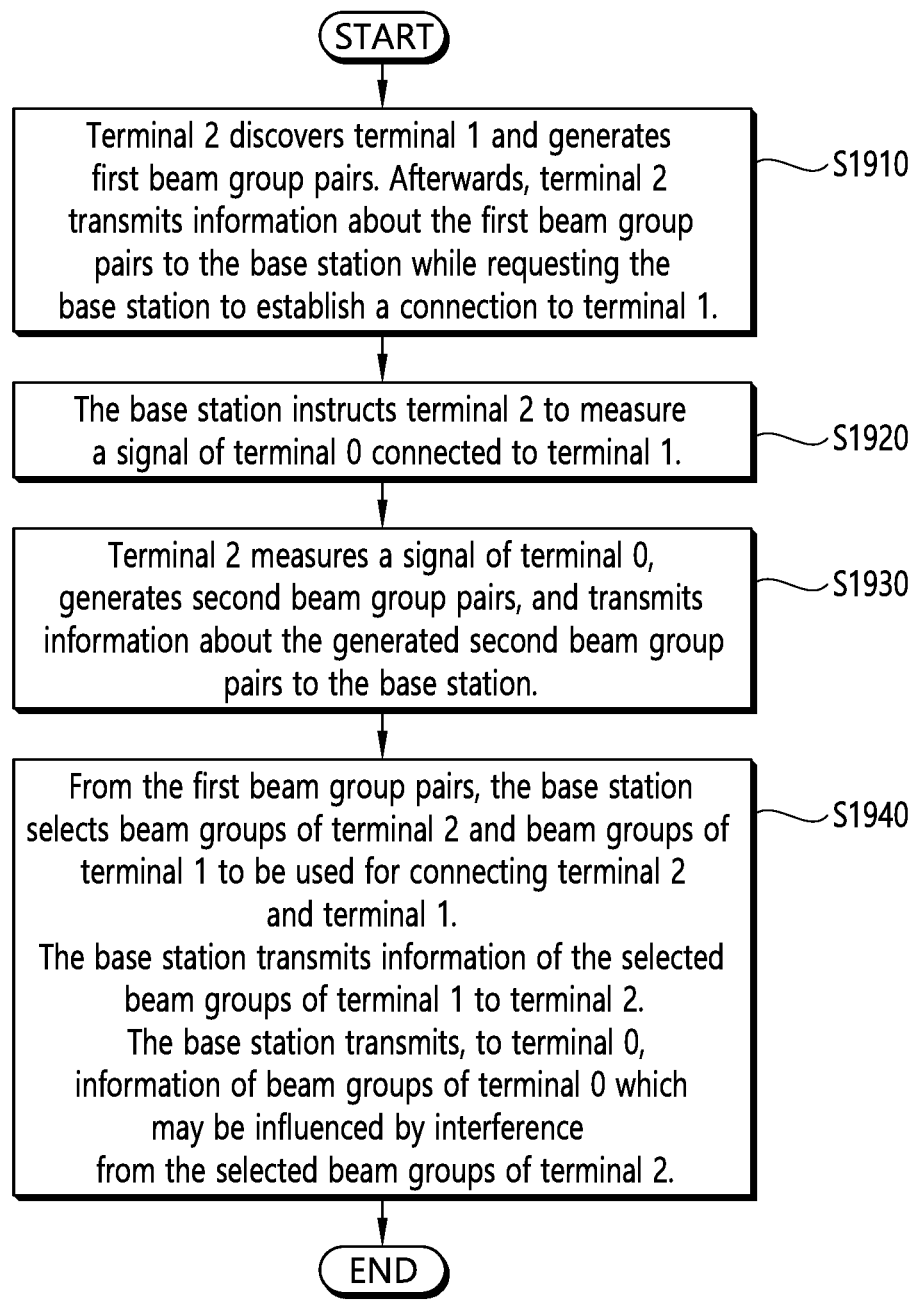
FIG. 19 illustrates a flow diagram for establishing a connection among a plurality of terminals when terminal 2 figures out a connection state of terminal 1 and terminal 0 after requesting establishment of a connection to terminal 1 according to an embodiment of the present invention.

As one example, a method for terminal 2 to acquire the information that terminal 1 and terminal 0 are connected to each other may be divided into a method (which is shown in FIG. 19) for explicitly informing terminal 2 of the information by an arbitrary device and a method for acquiring the information implicitly according to a predetermined rule by terminal 2. In what follows, each method will be described.

If terminal 2 acquire the information beforehand, a procedure is required, where, after terminal 2 request establishment of a connection to terminal 1, the base station requests terminal to measure a signal of terminal 0 again. However, if terminal 2 knows in advance that terminal 1 is connected to terminal 0, it becomes possible that while requesting establishment of a connection to terminal 1, terminal 2 transmits to the base station information about interference exerted by terminal 2 on terminal 0 and interference exerted by terminal 2 on terminal 0. Therefore, if terminal 2 knows in advance that terminal 1 is connected to terminal 0, a procedure for establishing a connection between terminal 2 and terminal 1 may be simplified more than the case when terminal 2 does not know in advance that terminal 1 is connected to terminal 0.

In what follows, described will be a procedure used for the case when terminal 2 does not know in advance that terminal 1 is connected to terminal 0. Terminal 2 discovers terminal 1 and measures signal quality by using a reference signal of terminal 1. Afterwards, terminal 2 requests the base station (or terminal 1) to establish a connection to terminal 1. The base station (or terminal 1) which receives the request informs terminal 2 of existence of terminal 0 connected to terminal 1 and instructs terminal 2 to measure signal quality of terminal 0. By doing so, according to the instruction given by the base station, terminal 2 may know that terminal 1 is connected to terminal 0.

In what follows, described will be a procedure used for the case when terminal 2 knows in advance that terminal 1 is connected to terminal 0. The base station broadcasts inter-terminal communication groups within a cell and physical layer identifiers of terminals belonging to the respective groups within the cell. Terminal 2 which discovers terminal 1 recognizes though a common signal within the cell that terminal 1 has been connected to terminal 0 and also measures a signal of terminal 0.

However, the embodiment above has a drawback that the amount of broadcasting signals within a cell increases. When the number of in-cell communication groups is small, it is possible to apply the method above; however, it becomes inefficient when the number of in-cell communication groups is large. Therefore, the proposed method is more advantageous when it is applied to a high frequency base station or to a device with small coverage such as an RSU. If an RSU is not determined in a cell-based operating scenario, a different operating scenario may be used, where an RSU adds the information by itself to relay a signal.

Also, terminals which have already established a connection transmit physical layer identifier information of their connected terminal to a broadcasting signal for communication among terminals. As one example, terminal 2 which has discovered terminal 1 may know that terminal 1 is connected to terminal 0 by decoding a broadcasting signal of terminal 1. Afterwards, terminal 2 measures an optimal beam group of a signal transmitted by terminal 0 and received signal strength.

In general, the amount of information that may be transmitted by a broadcasting signal is predetermined. Therefore, if a physical layer identifier transmission field of a terminal established for a connection is configured to be carried by a broadcasting signal, there is a disadvantage that information has to be transmitted even when there is no actual connection. Therefore, when the maximum number of connections that a terminal may establish is large, it is difficult to apply the present method. If the maximum number of connections among terminals that a terminal may establish is x, a broadcasting signal has to be able to transmit (x−1) physical layer identifier information.

Also, terminal 2 measures all of received signals exceeding a threshold and transmits the measurement to the base station. As one example, when terminal 2 generates second beam group pair information to be described later, terminal 2 may transmit not only the information about beam groups of terminal 0 but also information of beam groups of other terminals to the base station. Therefore, when terminal 2 transmits the second beam group pair information to be described later, terminal 2 transmits, to the base station, the second beam group pair information by adding thereto identifier information of terminals belonging to the second beam group pairs together with the information about second beam group pairs exceeding a threshold. Receiving the information, the base station informs terminal 2 of information of beam groups of terminal 1 to be used for connecting terminal 1 and terminal 2 together with information about beam group pairs (which cause interference between terminals) actually valid during transmission.

The embodiment described above has an advantage that additional signaling is not required but at the same time, has a disadvantage that complexity of terminal 2 is increased. To reduce the complexity, the following method may be applied.

Terminals belonging to the same communication group are made to transmit a reference signal for measuring signal quality in the same subframe. If terminal 2 discovers terminal 1, quality of a signal from other resource block within the same subframe is measured, and second beam group pair information to be described later is generated by using signals exceeding a threshold value. Afterwards, when terminal 2 transmits the second beam group pair information to be described later, terminal 2 transmits, to the base station, the second beam group pair information by adding thereto identifier information of terminals belonging to the second beam group pairs together with the information about second beam group pairs exceeding a threshold. Receiving the information, the base station informs terminal 2 of information of beam groups of terminal 1 to be used for connecting terminal 1 and terminal 2 together with information about beam group pairs (which cause interference between terminals) actually valid during transmission.

The embodiment described above provides an advantage as follows. In general, terminals belonging to a communication group exchange signals frequently. If terminal B is in the middle of transmitting a broadcasting signal when terminal A wants to transmit a signal to terminal B, the signal may not be transmitted. Therefore, it is more advantageous when communication is performed among terminals to allocate a discovery signal or broadcasting signal transmitted by terminals within a communication group to the same subframe. Also, terminal 2 provides an effect of reducing the number of resources for measuring signal quality.

Also, the application condition may be relieved when the embodiment above is applied so that terminal 2 may be made to measure a signal of other resource block within x subframes before and after the subframe at which terminal 1 is discovered.

The following embodiment describes a terminal operation which may be applied after terminal 2 figures out that terminal 1 has been connected to terminal 0 by using the embodiment described above.

Terminal 2 measures a signal of terminal 1 and terminal 0. Afterwards, terminal 2 generates first L1 beam group pairs in the order of signal magnitude when receiving a signal of terminal 1. The generated beam group pairs are called first beam group pairs. The first beam group pairs comprise a transmission beam group of terminal 1 and a reception beam group of terminal 2. Also, terminal 2 generates first L0 beam group pairs in the order of signal magnitude among transmission beam groups of terminal 0 received by reception beam groups belonging to the first beam group pairs. The generated beam group pairs are called second beam group pairs. The second beam group pairs comprise a transmission beam group of terminal 0 and a reception beam group of terminal 2. Afterwards, the terminal transmits information about the first beam group pairs and information about the second beam group pairs to the base station.

The embodiment above has been developed to efficiently transmit information about interference between neighboring terminals when communication is performed among terminals. It is assumed that terminal 2 has beam groups of 2-1, 2-2, 2-3, and 2-4. It is also assumed that terminal 2 measures a signal of terminal 1, and from the measurement, beam group 2-1 and 2-2 are selected as beam groups suitable for communication with terminal 1. At this time, a signal of terminal 0 received from beam group 2-1 and 2-2 may act as interference to terminal 2. The magnitude of a signal of terminal 0 received from beam group 2-3 and 2-4 not used by terminal 2 does not affect terminal 2 as interference. Also, considering channel reciprocity, it may be determined that terminal 2 will transmit a signal to terminal 1 by using beam group 2-1 or 2-2. Therefore, a signal transmitted from beam group 2-1 and 2-2 of terminal 2 may act as interference to terminal 0. At this time, when the channel reciprocity property is applied, the average magnitude of interference that terminal 0 receives from terminal 2 may be considered to be similar to the average magnitude of interference that terminal 2 receives from terminal 0.

Figure 17:
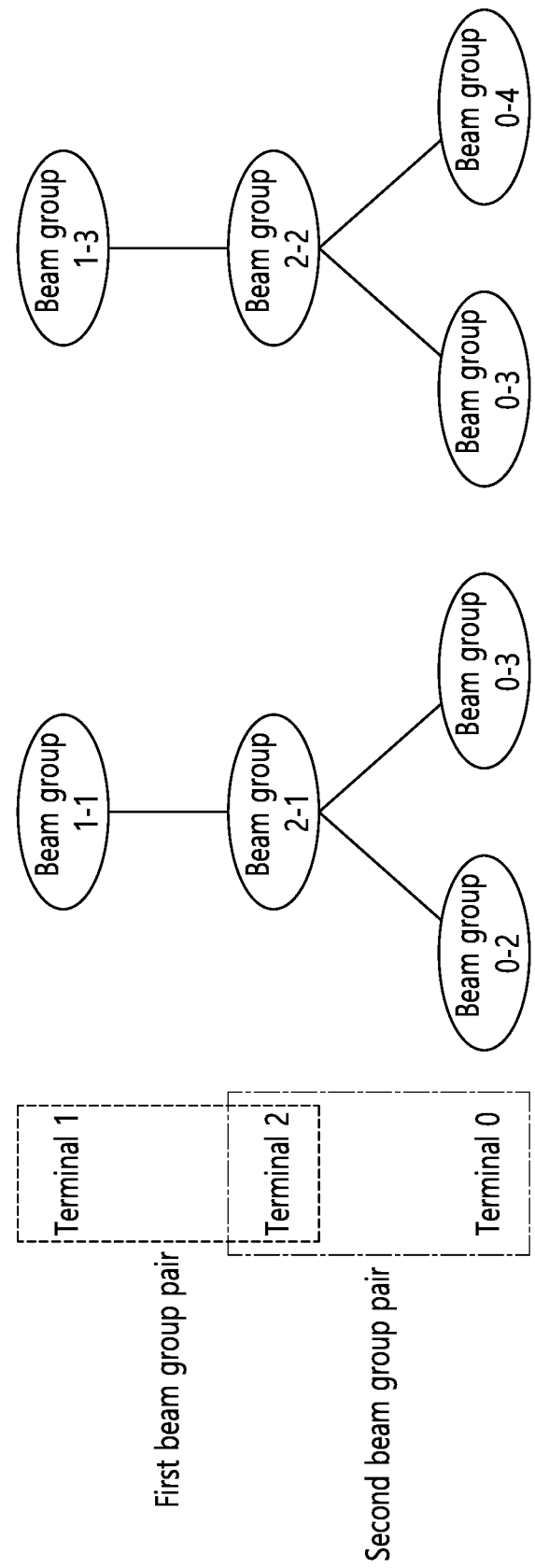
FIG. 17 illustrates one example of a first beam group pair and a second beam group pair selected by terminal 2 according to an embodiment of the preset specification.

FIG. 17 illustrates one example of a first beam group pair and a second beam group pair selected by terminal 2 according to an embodiment of the preset specification. The information that terminal 2 transmits to a base station in the embodiment above may be illustrated as shown in FIG. 17.

It is assumed that terminal 1 has beam group 1-1, 1-2, 1-3, and 1-4; terminal 2 has beam group 2-1, 2-2, 2-3, and 2-4; and terminal 0 has beam group 0-1, 0-2, 0-3, and 0-4. Also, it is assumed that L1=L0=2. Referring to FIG. 17, terminal 2 measures a signal of terminal 1 in beam group units and selects beam group pairs (1-1, 2-1) and (1-3, 2-2) as first beam group pairs. Also, terminal 2 may form beam group 0-2 and 0-3, which are beam groups of terminal 0 exhibiting strong signal strength when measured by the beam group 2-1, as second beam group pairs and may also include beam group 0-3 and 0-4, which are beam groups exhibiting strong signal strength when measured by the beam group 2-2, into the second beam group pairs.

Now it is assumed that among the first beam groups, (1-1, 2-1) is determined to be used for connecting terminal 1 and terminal 2. At this time, if terminal 2 transmits a signal by using the beam group 2-1, terminal 0 may receive interference from the beam group 0-2 or 0-3. Also, if terminal 0 transmits a signal from the beam group 0-2 or 0-3, terminal 2 may receive interference from the beam group 2-1. Therefore, when the beam group pair (1-1, 2-1) is used for connecting terminal 1 and terminal 2, the base station may perform scheduling so that the beam group pairs of (2-1, 0-2) and (2-1, 0-3) are not used for the same resource. By doing so, a procedure for measuring interference between neighboring terminals may be omitted or simplified.

The information of FIG. 17 may be substituted as shown in Table 1 and informed to the base station by terminal 2.

TABLE 1

| Terminal 1 | Terminal 2 | Terminal 0 |
| --- | --- | --- |
| 1-1 | 2-1 | 0-2 |
|  |  | 0-3 |
| 1-3 | 2-2 | 0-3 |
|  |  | 0-4 |

Also, it is assumed that terminal 2 measures information of terminal 1 and reports the information to the base station in advance. At this time, the procedure of the embodiment above is changed as follows. In other words, the procedure is changed from one shown in FIG. 18 to the procedure shown in FIG. 19. Terminal 2 measures a signal from terminal 0. Among transmission beam groups of terminal 0 received by each reception beam group of terminal 2 belonging to the pre-selected first beam group pairs, information about the first L0 beam groups in the order of signal magnitude is generated. The generated beam groups are called the second beam group pairs. Afterwards, the terminal transmits information about the second beam group pairs to the base station.

The present embodiment may be applied when terminal 2 does not know in advance that terminal 1 and terminal 0 are connected to each other (shown in FIG. 19). At this time, terminal 2 transmits first beam group pairs obtained by measuring a signal of terminal 1 to the base station, and the base station which receives the first beam group pairs instructs terminal 2 to measure the signal of terminal 0. Therefore, terminal 2 measures only the signal of terminal 0 and transmits information about the second beam group pair to the base station.

Also, there are three different methods for composing information about first beam group pairs and information about second beam group pairs. The first method informs of only beam group indexes. The second method lists up the beam group indexes in the order of signal magnitude and informs of relative magnitude (or priority) of a signal. The third method informs of beam group indexes and received signal strength corresponding to each beam group index.

When only the beam group index is used, terminal 2 only have to transmit the information of Table 1 to the base station. If signals are listed up in the order of signal magnitude according to the priority, signal magnitude of a beam group pair placed in the upper row of Table 1 may be regarded as being relatively larger. Referring to Table 1, among the first beam group pairs, (1-1, 2-1) has the highest priority, and (2-1, 0-2) has the highest priority among the second beam group pairs. If received signal strength is informed for each beam group pair, information as shown in Table 2 has to be transmitted additionally. At this time, if a terminal transmits a signal strength index, the base station may estimate actual signal strength from the transmitted signal strength index. In other words, the base station may estimate the signal strength according to the signal strength index.

TABLE 2

| Beam group pair | Signal magnitude index |
| --- | --- |
| (1-1, 2-1) | 5 |
| (1-3, 2-2) | 4 |
| (2-1, 0-2) | 3 |
| (2-1, 0-3) | 2 |
| (2-2, 0-4) | 2 |

As another example, the base station informs terminal 2 of threshold 1 and threshold 2 to be used by terminal 2 when the first beam group pairs and the second beam group pairs are selected. The threshold information may be broadcast within a cell as cell-common information or informed to each terminal as UE-specific information by using an RRC signal or L2/L3 signal.

If a threshold value is selected, the amount of signals that terminal 2 transmits to the base station may be reduced. As one example, if the second beam group pair (2-2, 0-3) is smaller than threshold 2, terminal 2 does not transmit the corresponding beam group pairs to the base station. Therefore, Table 1 is changed as shown in Table 3 below.

TABLE 3

| Terminal 1 | Terminal 2 | Terminal 0 |
| --- | --- | --- |
| 1-1 | 2-1 | 0-2 |
|  |  | 0-3 |
| 1-3 | 2-2 | 0-4 |

In the same way, although not shown in Table 3, when the first beam group pairs are smaller than threshold 1, terminal 2 does not transmit the corresponding beam group pairs to the base station.

Terminal 2 may not inform the base station of its reception beam group among the first and second beam group pairs. In this case, the first and second beam group pairs are substituted by the beam group indexes (or reference signal indexes) of terminal 1 and beam group indexes (or reference signal indexes) of terminal 0.

When the method above is applied, terminal 2-related information in Table 1 is not transmitted, and Table 2 then shows the beam group indexes of terminal 1 and beam group indexes of terminal 0 rather than beam group pair information. If a beam group corresponds to orthogonal reference signals, beam group indexes may be substituted by reference signal indexes.

In what follows, operations of a base station after performing the operation according to the embodiment above will be described.

A base station which has received the first and second beam group pair information selects a beam group of terminal 1 to be used for connecting terminal 1 and terminal 2. Afterwards, the base station informs terminal 2 of the fact that a connection to terminal 1 has been established and of the beam group of terminal 1 used for the connection. Also, the base station informs terminal 1 of the fact that a connection to terminal 2 has been established and of the beam group of terminal 1 used for the connection. Also, the base station informs terminal 0 of beam group information of terminal 0 which pairs with reception beam groups of terminal 2 used for connecting to terminal 1 among the second beam group pairs.

As one example, it is assumed that among the first beam group pairs of FIG. 17 and Table 1, (1-1, 2-1) is determined to be used for connecting terminal 1 and terminal 2. At this time, if terminal 2 transmits a signal by using beam group 2-1, terminal 0 may receive interference from beam group 0-2 or 0-3. Therefore, it is necessary for the base station to inform terminal 0 that interference may be generated between beam group 0-2 and 0-3. The beam group information may simply include only beam group indexes or actual beam magnitude may be additionally transmitted.

Also, since terminal 2 has information corresponding to Tables 2 and 3, the base station only has to inform of signal information of terminal 1 used for a connection.

There are three different methods for composing beam group information of terminal 0. The first method informs of only transmission beam group indexes of terminal 0. The second method informs of priorities by listing up the beam group indexes of terminal 0 in the order of signal magnitude. The third method informs of beam group indexes of terminal 0 and received signal strength corresponding to each beam group index.

The base station transmits the following information to terminal 2 in addition to the beam group information of terminal 1. Among beam groups of terminal 0 belonging to the second beam group pairs, the base station informs of information of beam groups through which terminal 0 neither transmits nor receives a signal.

In other words, it may be the case that although terminal 2 has information about measured signal quality of terminal 0 through a reference signal of terminal 0, terminal 0 has transmitted only a reference signal, and the beam group has not actually performed data transmission. Therefore, the base station may inform terminal 2 of this situation. Terminal 2 which receives the information may assume that there will be no interference of terminal 0 in the corresponding beam group pairs and receive a signal or generate channel quality information and transmit the received signal or generated channel quality information to terminal 1 and base station.

The base station informs terminal 0 or terminal 1 of the beam group information of terminal 0 and/or beam group information of terminal 1 by adding thereto beam group information of terminal 2. The corresponding information may be applied when terminal 1 receives a signal of terminal 2. Also, the corresponding information may be used when terminal 0 receives a signal of terminal 1 and measures interference of terminal 2.

In what follows, described will be a main flow diagram of the present specification when all of the proposed methods are applied.

Figure 18:
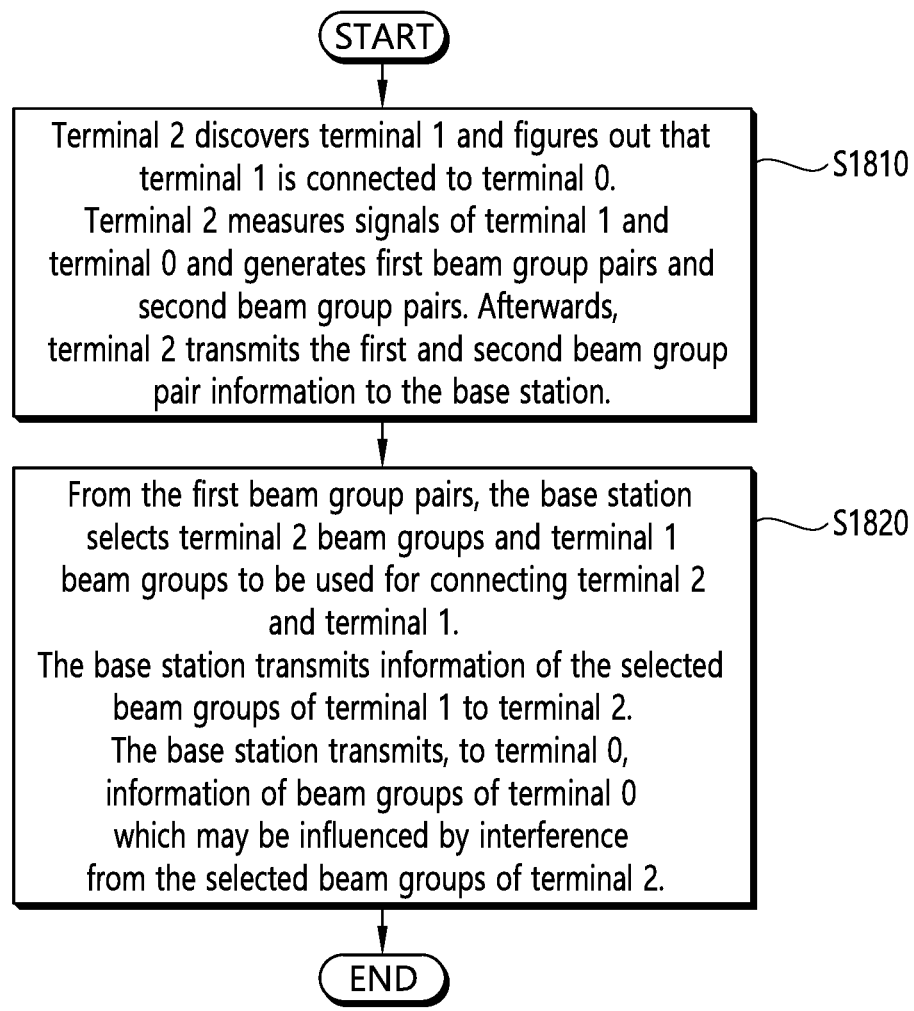
FIG. 18 illustrates a flow diagram for establishing a connection among a plurality of terminals when terminal 2 figures out a connection state between terminal 1 and terminal 0 beforehand according to an embodiment of the present invention.

FIG. 18 illustrates an embodiment where terminal 2 figures out the connection state between terminal 1 and terminal 0 at the time terminal 2 discovers terminal 1. FIG. 19 illustrates a main flow diagram when terminal 2 figures out that terminal 0 and terminal 1 are connected to each other after discovering terminal 1 and requesting a base station to establish a connection to terminal 1. The reason why a base station determines transmission and reception beam groups to be used for connecting terminal 1 and 2 after receiving the second beam group pairs in FIG. 19 is to establish a connection by also taking into account the interference between terminal 0 and 1.

FIG. 18 illustrates a flow diagram for establishing a connection among a plurality of terminals when terminal 2 figures out a connection state between terminal 1 and terminal 0 beforehand according to an embodiment of the present invention.

In the S1810 step, terminal 2 discovers terminal 1 and figures out that terminal 1 is connected to terminal 0. Terminal 2 measures signals of terminal 1 and terminal 0 and generates first beam group pairs and second beam group pairs. Afterwards, terminal 2 transmits the first and second beam group pair information to the base station.

In the S1820 step, from the first beam group pairs, the base station selects terminal 2 beam groups and terminal 1 beam groups to be used for connecting terminal 2 and terminal 1. The base station transmits information of the selected beam groups of terminal 1 to terminal 2. The base station transmits, to terminal 0, information of beam groups of terminal 0 which may be influenced by interference from the selected beam groups of terminal 2.

By doing so, the base station performs scheduling so that the first beam group pairs including beam group information of terminal 1 and the second beam group pairs including beam group information of terminal 0 may not be used for transmitting a signal from the same resource.

FIG. 19 illustrates a flow diagram for establishing a connection among a plurality of terminals when terminal 2 figures out a connection state of terminal 1 and terminal 0 after requesting establishment of a connection to terminal 1 according to an embodiment of the present invention.

In the S1910 step, terminal 2 discovers terminal 1 and generates first beam group pairs. Afterwards, terminal 2 transmits information about the first beam group pairs to the base station while requesting the base station to establish a connection to terminal 1.

In the S1920 step, the base station instructs terminal 2 to measure a signal of terminal 0 connected to terminal 1.

In the S1930 step, terminal 2 measures a signal of terminal 0, generates second beam group pairs, and transmits information about the generated second beam group pairs to the base station.

In the S1940 step, from the first beam group pairs, the base station selects beam groups of terminal 2 and beam groups of terminal 1 to be used for connecting terminal 2 and terminal 1. The base station transmits information of the selected beam groups of terminal 1 to terminal 2. The base station transmits, to terminal 0, information of beam groups of terminal 0 which may be influenced by interference from the selected beam groups of terminal 2.

By doing so, the base station performs scheduling so that the first beam group pairs including beam group information of terminal 1 and the second beam group pairs including beam group information of terminal 0 may not be used for transmitting a signal from the same resource.

Figure 20:
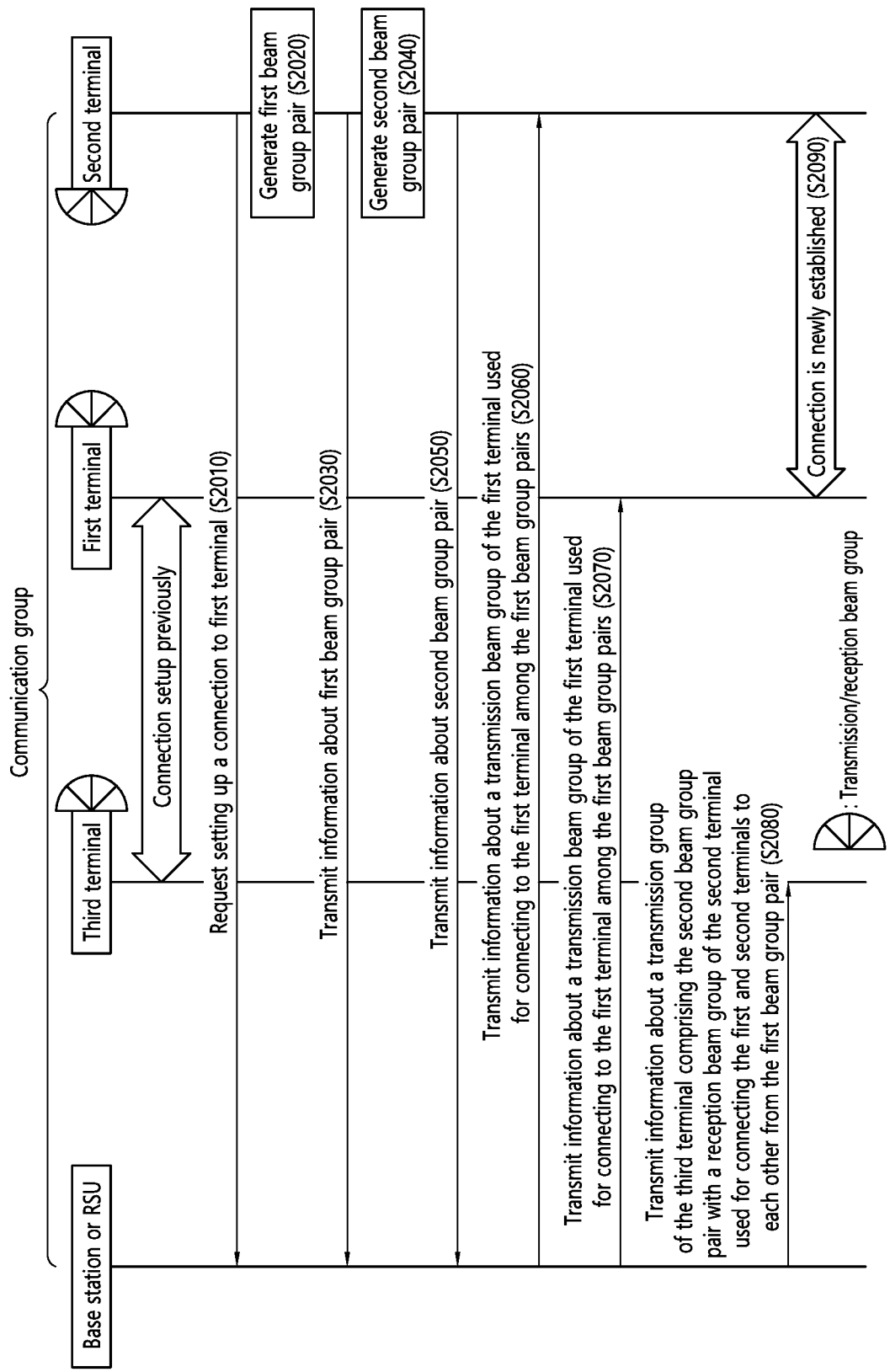
FIG. 20 illustrates the overall procedure for establishing a spatially divided connection among a plurality of terminals according to an embodiment of the present specification.

FIG. 20 illustrates the overall procedure for establishing a spatially divided connection among a plurality of terminals according to an embodiment of the present specification.

The present embodiment is related to communication among a plurality of terminals to which distributed antennas are applied, where the plurality of terminals perform communication by dividing a specific resource spatially by using a beam rather than in terms of frequency. At this time, a terminal may have a plurality of radio units (RUs), where an RU may correspond to an antenna port, and a beam group may be configured based on the antenna port.

Also, the present embodiment proposes a procedure and signaling required for a second terminal to establish a connection to a first terminal while the first terminal is connected to a third terminal.

In the S2010 step, the second terminal requests a base station to establish a connection to the first terminal. At this time, the first terminal is already connected to the third terminal. For the sake of convenience, the present specification assumes that a connection establishment request object is a base station, but the base station may be substituted by a road side unit (RSU) which performs a function similar to that of the base station, an RSU in the form of a terminal, or a terminal which performs the role of a cluster head within a communication group.

In the S2020 step, the second terminal measures a signal of the first terminal and generates a first beam group pair comprising a transmission beam group of the first group comprising first L1 transmission beams of the first terminal in the order of signal magnitude and a reception beam group of the second terminal. The first terminal may transmit a signal of the first terminal to the transmission beam group of the first terminal, and the second terminal may receive a signal of the first terminal to the reception beam group of the second terminal.

Here, the first beam group pair comprising beam groups exhibiting large signal magnitude comprises optimal beam groups suitable for communication of the first and second terminals. In other words, the second terminal may communicate with the first terminal by using a specific beam pair among the optimal beam groups suitable for communication between the first and second terminals.

In the S2040 step, when the second terminal receives a signal of the third terminal by using the reception beam group of the second terminal, the second terminal measures a signal of the third terminal and generates a second beam group pair comprising a transmission beam group of the third group comprising first L0 transmission beams of the third terminal in the order of signal magnitude and a reception beam group of the second terminal. In other words, the third terminal may transmit a signal of the third terminal to the transmission beam group of the third terminal, and the second terminal may receive the signal of the third terminal through the reception beam group of the second terminal configured previously for connecting to the first terminal. Here, L1 and L0 are natural numbers.

Here, the second beam group pair comprising beam groups exhibiting large signal magnitude comprises beam groups exerting large interference on communication between the first and second terminals. Large magnitude of a signal of the third terminal received by the reception beam group of the second terminal may be applied to the communication between the first and second terminal, which employs the reception beam group of the second terminal, as interference. In other words, information about the second beam group pair may be regarded as being used as interference information between neighboring terminals.

In the S2030 and S2050 steps, the second terminal transmits information about the first beam group pair and the second beam group pair to the base station.

The information about the first beam group pair may include a beam group index of each terminal belonging to the first beam group pair or a signal magnitude index corresponding to the beam group index of each terminal belonging to the first beam group pair. The information about the second beam group pair may include a beam group index of each terminal belonging to the second beam group pair or a signal magnitude index corresponding to the beam group index of each terminal belonging to the second beam group pair. The beam group index or beam index described in the present specification may be expressed explicitly as a beam group index or beam index when a base station and a terminal exchange a signal or expressed implicitly as a time index and/or reference signal index. As one example, when the number of analog beams that a terminal may generate by using one OFDM symbol is 1, the beam index may one-to-one correspond to the time index at which a reference signal is transmitted. As another example, if the number of analog beams that a terminal may generate by using one OFDM symbol is N, the beam index may correspond to the time index at which the n-th reference signal is transmitted. Here, n is an integer having a value of 1, 2, . . . , N.

Also, the reception beam group index of the second terminal may not be included in the information about the first beam group pair and the second beam group pair. By so doing, the amount of information about the first and second beam group pairs may be reduced.

The present embodiment may be divided into a case where the second terminal figures out the information in advance that the first and third terminals are connected to each other and a case where the second terminal does not know the information beforehand.

The following case illustrates a situation where the second terminal figures out the information in advance that the first and third terminals are connected to each other. A base station may broadcast a physical layer identifier of a terminal within a cell to the second terminal. The second terminal may check whether the first and third terminals are connected to each other based on the physical layer identifier of the terminal within the cell. In other words, the second terminal may figure out in advance through a common signal within the cell that the first and third terminals are connected to each other.

The following case illustrate a situation where the second terminal does not know the information in advance that the first and third terminals are connected to each other. First, the second terminal discovers the first terminal, measures a signal of the first terminal, and transmits information about a first beam group pair to a base station. After receiving the information about the first beam group pair from the second terminal, the base station may transmit indication information which instructs to measure a signal of the third terminal to the second terminal. In other words, the information that the first and third terminals are connected may be transmitted to the second terminal based on the indication information. Based on the indication information, the second terminal may check whether the first and third terminals are connected to each other. In other words, only after the second terminal receives indication information of a base station, the second terminal may figure out that the first and third terminal are connected to each other.

In the S2060 step, the second terminal receives, from the base station, information about a transmission beam group of the first terminal used for connecting to the first terminal from the first beam group pair.

Also, in the S2070 step, the base station may transmit to the first terminal information about a transmission beam group of the first terminal used for a connection between the first and second terminals from the first beam group pair. In other words, the base station selects a specific beam group from the first beam group pair received from the second terminal and determines to use the selected specific beam group for connecting to the first terminal. And the base station informs the first and second terminals of the information about a specific beam group (the transmission beam group of the first terminal) used for connecting to the first terminal.

Also, in the S2080 step, the base station may transmit, to the third terminal, information about a transmission group of the third terminal comprising the second beam group pair with a reception beam group of the second terminal used for connecting the first and second terminals to each other from the first beam group pair. At this time, the transmission beam group of the third terminal comprising the second beam group pair with the reception beam group of the second terminal used for connecting to the first terminal may use the same time-frequency resource used for connecting the first and second terminals (which may be applied as interference).

In other words, the base station informs the third terminal of the information about a transmission beam group of the third terminal which acts as interference on a specific beam group (the transmission beam group of the first terminal) selected from the first beam group pair. By doing so, the third terminal may not use the transmission beam group of the third terminal in a specific resource, which acts as interference to the transmission beam group of the first terminal selected from the first beam group pair. The specific resource may correspond to a resource used by the first and second terminals to transmit and receive a signal through a specific beam group selected from the first beam group.

In other words, the base station may perform scheduling so that the transmission beam group of the first terminal used for connecting the first and second terminals, reception beam group of the second terminal used for connecting the first and second terminals, and transmission beam group of the third group comprising the second beam group pair are not used in the same resource.

As another example, the base station may transmit, to the second terminal, the information about the transmission beam group of the third terminal which does not transmit a signal of the third terminal among transmission beam groups of the third terminal belonging to the second beam group pair. The transmission beam group of the third terminal which does not transmit a signal of the third terminal may not act as interference to the reception beam group of the second terminal used for connecting to the third terminal.

Through the beam group scheduling procedure of a base station, in the S2090 step, a new connection may be configured for the first and second terminals by using the transmission beam group of the first terminal and the reception beam group of the second terminal selected from the first beam group pair. Also, the third terminal may maintain a connection to the first terminal without using the transmission beam group of the third terminal which may act as interference to the transmission beam group of the first terminal selected from the first beam group pair in the same resource.

Therefore, the present embodiment may perform spatially divided communication among a plurality of terminals while omitting a procedure for measuring interference between neighboring terminals.

Figure 21:
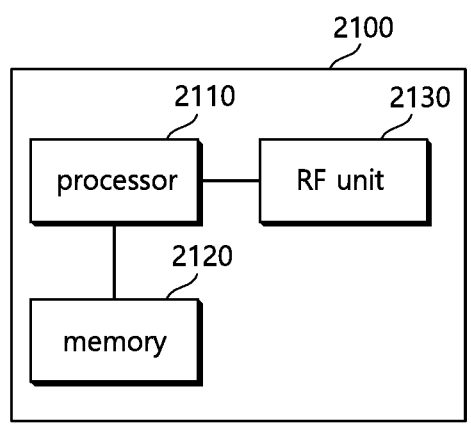
FIG. 21 is a block diagram showing an apparatus for wireless communication for implementing an embodiment of the present invention.

FIG. 21 is a block diagram showing an apparatus for wireless communication for implementing an embodiment of the present invention.

An apparatus 2100 for wireless communication includes a processor 2110, a memory 2120 and a radio frequency (RF) unit 2130.

The processor 2110 may be configured to implement proposed functions, procedures and/or methods described in this description. Layers of the radio interface protocol may be implemented in the processor 2110. The processor 2110 may handle a procedure explained above. The memory 2120 is operatively coupled with the processor 2110, and the RF unit 2130 is operatively coupled with the processor 2110.

The processor 2110 may include application-specific integrated circuit (ASIC), other chipset, logic circuit and/or data processing device. The memory 2120 may include read-only memory (ROM), random access memory (RAM), flash memory, memory card, storage medium and/or other storage device. The RF unit 2130 may include baseband circuitry to process radio frequency signals. When the embodiments are implemented in software, the techniques described herein can be implemented with modules (e.g., procedures, functions, and so on) that perform the functions described herein. The modules can be stored in memory 2120 and executed by processor 2110. The memory 2120 can be implemented within the processor 2110 or external to the processor 2110 in which case those can be communicatively coupled to the processor 2110 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method for setting a spatially divided connection between terminals for vehicle-to-everything (V2X) communication, the method comprising:
   requesting, by a second terminal, a base station to establish a connection to a first terminal, wherein the first terminal is already connected to a third terminal;
   measuring, by the second terminal, a signal of the first terminal, and generating, by the second terminal, a first beam group pair comprising a transmission beam group of the first group comprising first $L_1$ transmission beams of the first terminal in the order of signal magnitude and a reception beam group of the second terminal;
   when the second terminal receives a signal of the third terminal by using the reception beam group of the second terminal, measuring, by the second terminal, a signal of the third terminal, and generating, by the second terminal, a second beam group pair comprising a transmission beam group of the third group comprising first $L_0$ transmission beams of the third terminal in the order of signal magnitude and a reception beam group of the second terminal;
   transmitting, by the second terminal, information about the first beam group pairs and information about the second beam group pairs to the base station; and
   receiving, by the second terminal from the base station, information about a transmission beam group of the first terminal used for connecting to the first terminal among the first beam group pairs, wherein $L_1$ and $L_0$ are natural numbers.

2. The method of claim 1, wherein information about a transmission beam group of the first terminal used for connecting to the first terminal among the first beam group pairs is transmitted to the first terminal, and
   information about a transmission group of the third terminal comprising the second beam group pair with a reception beam group of the second terminal used for connecting to the first terminal among the first beam group pairs to the third terminal.

3. The method of claim 2, wherein the transmission beam group of the third terminal comprising the second beam group pair with the reception beam group of the second terminal used for connecting to the first terminal uses the same time-frequency resource used for connecting the first and second terminals.

4. The method of claim 1, wherein the information about the first beam group pair includes a beam group index of each terminal belonging to the first beam group pair or a signal magnitude index corresponding to the beam group index of each terminal belonging to the first beam group pair, and
   the information about the second beam group pair includes a beam group index of each terminal belonging to the second beam group pair or a signal magnitude index corresponding to the beam group index of each terminal belonging to the second beam group pair.

5. The method of claim 4, wherein the reception beam group index of the second terminal is not included in the information about the first beam group pair and the second beam group pair.

6. The method of claim 1, further comprising:
   receiving, by the second terminal, a physical layer identifier of a terminal within a cell broadcast from the base station; and
   checking, by the second terminal, based on the physical layer identifier of a terminal within a cell whether the first and the third terminals are connected to each other.

7. The method of claim 1, further comprising:
   after transmitting information about the first beam group pair by the second terminal, receiving, by the second terminal, indication information from the base station which instructs to measure a signal of the terminal 3; and
   based on the indication information, checking, by the second terminal, whether the first and third terminals are connected to each other.

8. A method for setting a spatially divided connection between terminals for vehicle-to-everything (V2X) communication, comprising:
   receiving, by a base station from a second terminal, request information requesting establishment of a connection to a first terminal, wherein the first terminal is already connected to a third terminal;
   receiving, by the base station from the second terminal, information about a first beam group pair and a second beam group pair, wherein
   the first beam group pair is configured of a transmission beam group of the first group comprising first $L_1$ transmission beams of the first terminal in the order of signal magnitude and a reception beam group of the second terminal by measuring a signal of the first terminal; and when the second terminal receives a signal of the third terminal by using the reception beam group of the second terminal, the second beam group pair is configured of a transmission beam group of the third group comprising first $L_0$ transmission beams of the third terminal in the order of signal magnitude and a reception beam group of the second terminal by measuring a signal of the third terminal; and transmitting, by the base station, information about a transmission beam group of the first terminal used for connecting the first and second terminals among the first beam group pairs to the second terminal, wherein $L_1$ and $L_0$ are natural numbers.

9. The method of claim 8, further comprising:

transmitting information about a transmission beam group of the first terminal used for connecting the first and second terminals among the first beam group pairs to the first terminal by the base station, and transmitting information about a transmission group of the third terminal comprising the second beam group pair with a reception beam group of the second terminal used for connecting the first and second terminals among the first beam group pairs to the third terminal by the base station.

10. The method of claim 9, wherein the transmission beam group of the third terminal comprising the second beam group pair with the reception beam group of the second terminal used for connecting the first and second terminals uses the same time-frequency resource used for connecting the first and second terminals.

11. The method of claim 9, further comprising:

Transmitting by the base station, to the second terminal, information about the transmission beam group of the third terminal which does not transmit a signal of the third terminal among transmission beam groups of the third terminal belonging to the second beam group pair, wherein the transmission beam group of the third terminal which does not transmit a signal of the third terminal does not act as interference to the reception beam group of the second terminal used for connecting to the third terminal.

12. The method of claim 9, further comprising:

performing scheduling by the base station so that the transmission beam group of the first terminal used for connecting the first and second terminals, reception beam group of the second terminal used for connecting the first and second terminals, and transmission beam group of the third group comprising the second beam group pair are not used in the same resource.

13. The method of claim 8, wherein the information about the first beam group pair includes a beam group index of each terminal belonging to the first beam group pair or a signal magnitude index corresponding to the beam group index of each terminal belonging to the first beam group pair, and the information about the second beam group pair includes a beam group index of each terminal belonging to the second beam group pair or a signal magnitude index corresponding to the beam group index of each terminal belonging to the second beam group pair.

14. The method of claim 13, wherein the reception beam group index of the second terminal is not included in the information about the first beam group pair and the second beam group pair.

15. The method of claim 8, further comprising:

broadcasting, by the base station, a physical layer identifier of a terminal within a cell to the second terminal, wherein information that the first and third terminals are connected to each other is transmitted to the second terminal based on the physical layer identifier of a terminal within a cell.

16. The method of claim 8, further comprising:

after receiving the information about the first beam group pair from the second terminal by the base station, transmitting indication information which instructs to measure a signal of the third terminal to the second terminal by the base station, wherein the information that the first and third terminals are connected is transmitted to the second terminal based on the indication information.

* * * * *